United States Patent
White et al.

(10) Patent No.: US 12,085,430 B2
(45) Date of Patent: Sep. 10, 2024

(54) SYSTEMS AND METHODS FOR OPERATION OF A SONIC ANEMOMETER

(71) Applicants: Trustees of Tufts College, Medford, MA (US); Cornell University, Ithaca, NY (US); VANDERVALK NEESON INSTRUMENTS LTD., Elizabethtown (CA)

(72) Inventors: Robert White, Lexington, MA (US); Don Banfield, Ithaca, NY (US); Ian Neeson, Elizabethtown (CA)

(73) Assignees: Trustees of Tufts College, Medford, MA (US); Cornell University, Ithaca, NY (US); Vandervalk Neeson Instruments Ltd., Elizabethtown (CA)

( * ) Notice: Subject to any disclaimer, the term of this patent is extended or adjusted under 35 U.S.C. 154(b) by 201 days.

(21) Appl. No.: 17/144,097

(22) Filed: Jan. 7, 2021

(65) Prior Publication Data

US 2021/0207984 A1    Jul. 8, 2021

Related U.S. Application Data

(60) Provisional application No. 62/958,030, filed on Jan. 7, 2020.

(51) Int. Cl.
*G01F 1/66* (2022.01)
*G01F 1/667* (2022.01)
(Continued)

(52) U.S. Cl.
CPC .............. *G01F 1/662* (2013.01); *G01F 1/667* (2013.01); *G01S 15/58* (2013.01); *G01W 1/02* (2013.01)

(58) Field of Classification Search
CPC ............ G01F 1/662; G01F 1/66; G01F 1/661; G01F 1/667; G01F 1/50;
(Continued)

(56) References Cited

U.S. PATENT DOCUMENTS

| 5,178,002 A | * | 1/1993 | Hanson | ..................... G01P 5/26 |
| | | | | 73/112.04 |
| 6,047,602 A | * | 4/2000 | Lynnworth | ............. G01F 1/662 |
| | | | | 73/632 |

(Continued)

OTHER PUBLICATIONS

Banfield, Don & Dissly, Richard. (2005). A Martian sonic anemometer. Geoforum. 2005. 641-647. 10.1109/AERO.2005.1559354. (Year: 2005).*

(Continued)

*Primary Examiner* — Lisa M Caputo
*Assistant Examiner* — Eric Sebastian Von Wald
(74) *Attorney, Agent, or Firm* — Quarles & Brady LLP

(57) ABSTRACT

A method of determining flow speed in a low pressure environment. The method includes obtaining bi-directional acoustic data from a plurality of transducer pairs as a fluid moves relative to the plurality of transducer pairs. The method further includes measuring phase lags corresponding to the bi-directional acoustic data, and determining bi-directional flight times using the phase lags. Additionally, the method includes calculating a flow speed of the fluid corresponding to each transducer pair from the bi-directional flight times. The method includes correcting for at least one of temperature effects, pressure effects, and wake effects, using a system model. The method further includes generating a report including the flow speed of the fluid.

21 Claims, 21 Drawing Sheets

(51) Int. Cl.
   *G01S 15/58* (2006.01)
   *G01W 1/02* (2006.01)
(58) Field of Classification Search
   CPC ...... G05B 2219/37032; G05B 2219/37; G05B 2219/37044; G05B 11/011; G01N 29/4418; G01N 29/44; G01N 29/4409; G01N 29/30; G01S 15/58; G01S 15/582; G01S 11/14; G01S 15/003; G01S 15/50; G01S 15/88; G01S 19/23; G01W 1/02; G01W 1/00; G01W 1/06; G01P 5/02; G01P 5/00; G01P 5/245; G01P 5/24
   See application file for complete search history.

(56) References Cited

U.S. PATENT DOCUMENTS

| | | | | |
|---|---|---|---|---|
| 7,254,493 | B1* | 8/2007 | Pelletier | G01F 1/66 340/856.4 |
| 8,235,662 | B2* | 8/2012 | LeClair | G01P 5/06 416/37 |
| 2006/0016243 | A1* | 1/2006 | Nevius | G01F 15/043 73/1.16 |
| 2012/0063268 | A1* | 3/2012 | Powell | E21B 47/107 367/89 |
| 2013/0294475 | A1* | 11/2013 | Derr | G01F 1/7082 374/1 |
| 2014/0200836 | A1* | 7/2014 | Lee | G01F 1/66 702/47 |
| 2014/0260668 | A1* | 9/2014 | Liu | G01F 1/66 73/861.28 |
| 2018/0164144 | A1* | 6/2018 | Ploss | G01F 1/665 |
| 2018/0313865 | A1* | 11/2018 | Osborn | G01P 5/245 |
| 2019/0128713 | A1* | 5/2019 | Campbell | G01S 7/521 |
| 2019/0242734 | A1* | 8/2019 | Nerowski | G01F 1/667 |
| 2019/0257680 | A1* | 8/2019 | Ji | G01F 1/66 |
| 2020/0142094 | A1* | 5/2020 | George | G01P 5/245 |
| 2021/0072275 | A1* | 3/2021 | Murray | G01P 5/245 |

OTHER PUBLICATIONS

Holstein-Rathlou, C., et al. (2014). An Environmental Wind Tunnel Facility for Testing Meteorological Sensor Systems, Journal of Atmospheric and Oceanic Technology, 31(2), 447-457. Retrieved Oct. 14, 2022, from https://journals.ametsoc.org/view/journals/atot/31/2/jtech-d-13-00141_1.xml (Year: 2014).*

Banfield, D., et al. "A Martian acoustic anemometer." The Journal of the Acoustical Society of America 140, No. 2 (2016): 1420-1428.

Banfield, D., et al. "A Martian sonic anemometer." In 2005 IEEE aerospace conference, pp. 641-647. IEEE, 2005.

Banfield, D., et al. "InSight Auxiliary Payload Sensor Suite (APSS)." Space Science Reviews 215, No. 1 (2019): 4.

Banfield, D., et al. "Mars acoustic anemometer." In AGU Spring Meeting Abstracts. 2004.

Chittenden, J. D., et al. "Experimental study of the effect of wind on the stability of water ice on Mars." Icarus 196, No. 2 (2008): 477-487.

Gomez-Elvira, J., et al. "Curiosity's rover environmental monitoring station: Overview of the first 100 sols." Journal of Geophysical Research: Planets 119, No. 7 (2014): 1680-1688.

Hess, S. L., et al. "Meteorological results from the surface of Mars: Viking 1 and 2." Journal of Geophysical Research 82.28 (1977).

Holstein-Rathlou, C., et al. "An environmental wind tunnel facility for testing meteorological sensor systems." Journal of atmospheric and oceanic technology 31, No. 2 (2014): 447-457.

Kieffer, H.H., et al., 1992. "Mars; Space Science Series". Arizona Press, Tucson, chapter 26, R.W. Zurek et al., p. 839, 842, 851, 896, 918.

McBean, G. A. "Instrument requirements for eddy correlation measurements." Journal of Applied Meteorology 11, No. 7 (1972): 1078-1084.

Petrosyan, A., et al. "The Martian atmospheric boundary layer." Reviews of Geophysics 49, No. 3 (2011).

Renno, N.O., et al. "A simple thermodynamical theory for dust devils." Journal of the atmospheric sciences 55, No. 21 (1998): 3244-3252.

Schofield, J. T., et al. "The Mars Pathfinder atmospheric structure investigation/meteorology (ASI/MET) experiment." Science 278, No. 5344 (1997): 1752-1758.

Swinbank, W. C. "The measurement of vertical transfer of heat and water vapor by eddies in the lower atmosphere." Journal of Meteorology 8, No. 3 (1951): 135-145.

Greeley, Ronald, and James D. Iversen. Wind as a geological process: on Earth, Mars, Venus and Titan. vol. 4. Cambridge University Press (1987) pp. 19-28, 32.

Zuckerwar A.J. "Handbook of the Speed of Sound in Real Gases," Academic Press, 2002. pp. 235-243.

* cited by examiner

SYSTEMS AND METHODS FOR OPERATION OF A SONIC ANEMOMETER

CROSS-REFERENCE TO RELATED APPLICATIONS

This application is related to, claims priority to, and incorporated herein in its entirety for all purposes U.S. Provisional Patent Application No. 62/958,030, filed Jan. 7, 2020.

STATEMENT REGARDING FEDERALLY FUNDED RESEARCH

This invention was made with government support under grant NNX16AJ24G awarded by the National Aeronautics and Space Administration (NASA). The government has certain rights in the invention.

BACKGROUND

A sonic anemometer uses ultrasonic sound waves to determine wind speed. Broadly, wind speed can be determined in real-time by measuring the effect of the wind on the speed of sound waves traveling between a pair of transducers. Measurements from multiple pairs of transducers can be combined to yield a measurement of velocity in 1-, 2-, or 3-dimensional flow. The lack of moving parts (in contrast to traditional mechanical sensors) makes sonic anemometers appropriate for long-term use in many environments, including exposed automated weather stations, weather buoys, wind turbines, and eddy covariance systems.

SUMMARY

The systems and methods described herein provide new ways to measure a wide range of conditions, such as over a range of wind/flow speeds. For example, the present disclosure provides for accurate flow measurements in low-pressure (e.g., <100 mbar) environments.

In one aspect, the present disclosure provides a sonic anemometer system for low pressure environments. The system includes a plurality of transducer pairs, each transducer pair including: a first ultrasound transducer for operating as at least one of a transmitter or a receiver of an acoustic signal, and a second ultrasound transducer for operating as at least another of the transmitter or the receiver of the acoustic signal. The system further includes a controller in communication with the plurality of transducer pairs. The controller is configured to obtain bi-directional acoustic data from the plurality of transducer pairs as a fluid moves relative to the plurality of transducer pairs. The controller is further configured to measure phase lags corresponding to the bi-directional acoustic data, and determine bi-directional flight times using the phase lags. Additionally, the controller is configured to calculate a flow speed of the fluid corresponding to each transducer pair from the bi-directional flight times. The controller is configured to correct for at least one of temperature effects, pressure effects, and wake effects, using a system model. Additionally, the controller is configured to generate a report including the flow speed of the fluid.

In another aspect, the present disclosure provides a method of determining flow speed in a low pressure environment. The method includes obtaining bi-directional acoustic data from a plurality of transducer pairs as a fluid moves relative to the plurality of transducer pairs. The method further includes measuring phase lags corresponding to the bi-directional acoustic data, and determining bi-directional flight times using the phase lags. Additionally, the method includes calculating a flow speed of the fluid corresponding to each transducer pair from the bi-directional flight times. The method includes correcting for at least one of temperature effects, pressure effects, and wake effects, using a system model. The method further includes generating a report including the flow speed of the fluid.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTIONS OF THE DRAWINGS

DETAILED DESCRIPTION

The presently-disclosed subject matter now will be described more fully hereinafter with reference to the accompanying drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

As indicated above, a sonic anemometer is a measurement of the motion of the air. Sound, as a longitudinal oscillation of the air molecules, is advected with winds. This principle can be explained using a one-dimensional scenario, where the further addition of two or more orthogonal axes enables measurement of a full three-dimensional wind vector.

Figure 1:
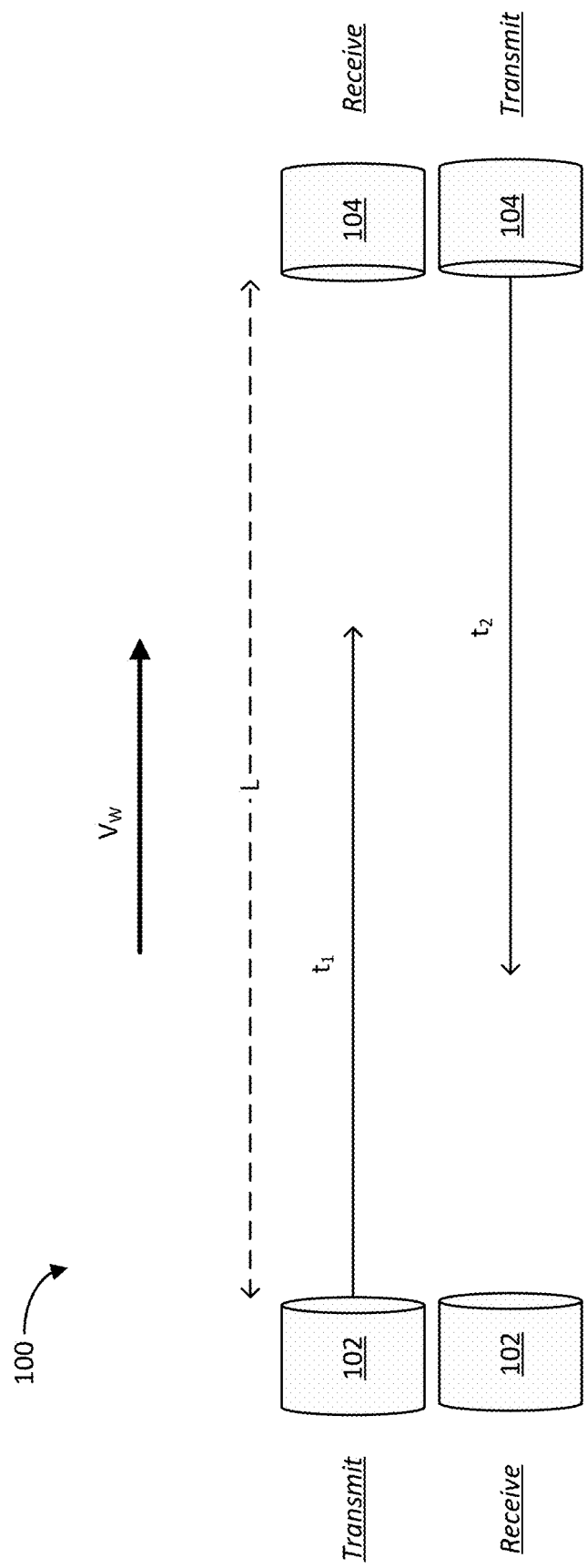
FIG. 1 is a block diagram showing a one-dimensional method of sonic anemometry, in accordance with the present disclosure.

Referring to FIG. 1, a one-dimensional method of sonic anemometry is shown, in accordance with the present disclosure. FIG. 1 is shown to include a sonic anemometer system 100 having two opposing transducers (102, 104) with a known separation length (L). The transducers 102, 104 can be configured to operate as both emitters and receivers, where sound pulses are emitted by one transducer and received by the other in an alternating fashion. The sound travel times in both directions ($t_1$, $t_2$) are then measured. The difference of the two travel times is proportional to the wind speed ($V_w$) along the parallel axis of the transducers 102, 104. The travel time with the wind (here, $t_1$) will be less than that against the wind (here, $t_2$). This method can be a very direct measure of the wind speed itself, as well as the speed of sound (c):

$$V_w = \frac{2L}{t_2 - t_1} \tag{1}$$

$$C = \frac{2L}{t_1 + t_2} \tag{2}$$

Sonic anemometry avoids many of the sources of measurement error that plague other techniques for measuring winds in planetary atmospheres. For example, at Mars, a hot wire/hot film approach has been used on previous missions. This technique estimates the wind speed by measuring the heat lost from a heated surface due to convective heat loss from the winds. Unfortunately, this technique can be affected by radiative heating, which, in relation to convective heat losses, is a much stronger force at Mars. Additionally, the convective heat losses at Mars are so low, it is not feasible to make a sensor that responds to winds less than about 1-2 m/s, or with a cadence faster than about 1 Hz.

In contrast, under Martian conditions, embodiments of the present disclosure can be sensitive to winds as small as ~5 cm/s (with precision also ~5 cm/s), and can produce independent measurements at 20 Hz. For both criteria, the present disclosure provides ~20 times improvement over the prior hot wire/film systems. Because sonic anemometry is a direct measure of the winds, it is not susceptible to measurement error from radiative heating. Other techniques for measuring winds in planetary atmospheres, such as laser-based tracking of dust scattering, wind vanes, or passive acoustics are unable to reach the speed, accuracy, and precision that sonic anemometry provides.

The presently-disclosed systems and methods of sonic anemometry can accurately measure the three-dimensional flow velocity (wind velocity), and the average speed of sound in a gas. The systems and methods of the present disclosure allow for accurate measurements in a variety of conditions, where traditional systems fail, or do not operate as consistently. For example, the systems and methods of the present disclosure enable measurements in the upper atmosphere on earth (e.g., above 50,000 feet) and for planetary science applications (such as on the surface of Mars, a cloud-level balloon mission to Venus, etc.). That is, the systems and methods provided herein can obtain accurate measurements in such environments despite the unique set of challenges associated with such environments that make traditional systems unsuitable.

The systems and methods provided herein are able to overcome a variety of challenges, even in highly-unique situations. A few, non-limiting examples of such challenges are provided. First, providing sufficient acoustic signal in a low-density atmosphere (e.g., <5% of earth sea level density) can be challenging, since acoustic signal strength is directly proportional to density (for an acoustic source of fixed source strength).

Second, correcting for errors introduced by temperature and pressure fluctuations can be challenging. On Mars, for example, surface temperatures can vary from −135° C. to +30° C. On earth, pressure fluctuation on a high-altitude atmospheric balloon flight could be from 1 bar to 5 mbar.

A third challenge involves correcting for errors introduced by wind shadowing. Wind shadowing generally refers to reduced wind flow as a result of the wake of the sonic anemometer arms. As will be described, this effect can be corrected for in order to measure the wind with the theoretical absence of the instrument.

The systems and methods of sonic anemometry disclosed herein address the above-mentioned challenges, as well as others. Although some aspects of the present disclosure are discussed in the context of a Martian atmosphere, persons of skill in the art will appreciate that such aspects are not limited to a Martian atmosphere. Rather, the presently-disclosed systems and methods are advantageously suited for a variety of applications (both terrestrial and non-terrestrial), including, but not limited to: planetary atmospheric science, high-altitude or upper atmospheric measurements on earth, sensitive measurements at earth's sea level (e.g., flow measurements <5 cm/s), clean room flow measurements, and HVAC systems.

In some configurations of the present disclosure, narrow band transducers with narrow-band tone bursts may be used to measure phase lag. Further, the phase lag can be used to determine the acoustic flight time. The use of phase lag measurements stands in contrast to prior methods, such as using broadband acoustic chirps and time domain cross-correlations techniques.

Figure 2:
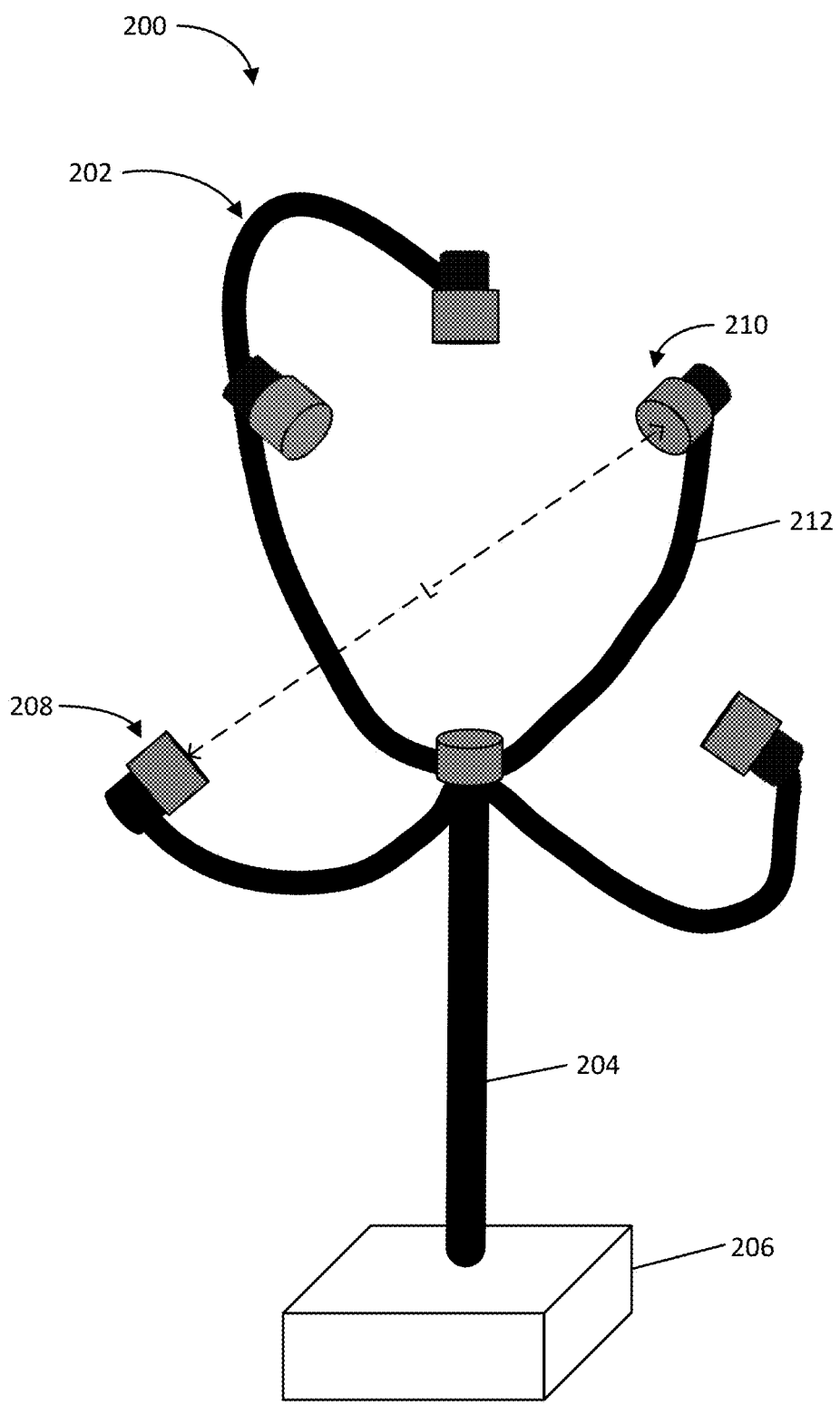
FIG. 2 is a diagram showing a sonic anemometry system, in accordance with the present disclosure.

Referring to FIG. 2, a sonic anemometry system 200 is shown, in accordance with aspects of the present disclosure. As shown, the sonic anemometry system 200 includes a generally spherical frame 202 supported by a mast 204. A control unit 206 can be affixed to the mast 204 and/or spherical frame 202 (e.g., as shown in FIG. 2). As shown, the spherical frame 202 can include a plurality of arms (e.g., arm 212). Each of the arms can extend from the base of the spherical frame 202 and are shown to terminate with a transducer (e.g., transducers 208, 210).

In some configurations, the control unit 206 can be separate from the mast 204 and spherical frame 202. In configurations where the control unit 206 is separate, a cable or other wiring may extend from the control unit 206 to the mast 204. In some configurations, the control unit 206 can include distinct components that may or may not be disposed within a single housing (e.g., a portion of the control unit 206 can be affixed near the base of the spherical frame 202, and another portion can be affixed at the base of the mast 204).

Signals can be conducted to and from the various transducers using, for example, miniature coaxial cables that feeding back to a control unit (e.g., control unit 206). In some configurations, the cables may be positioned at least partly within the mast 204 and/or the spherical frame.

The sonic anemometry system 200 generally includes one or more pairs of transducers (e.g., transducers 208, 210). Each additional pair of transducers can provide data for a unique axis, and according to the present disclosure, aggregate data from the transducer pairs can be utilized to determine flow speed and direction. In some configurations, the transducers act as both emitters and receivers (serially). Advantageously, this helps limit the size of the sonic anemometry system 200. In particular, the spherical frame 202 can be smaller, helping to minimize the wake and its impact on flow measurements.

Transducer pairs are positioned opposite one another (e.g., the transducer 208 is positioned opposite the transducer 210), and define an axis of bi-directional acoustic measurement. As shown, the transducer 208 is separated from the transducer 210 by a distance "L." Additional transducer pairs can be included, thus defining various orthogonal axes of bi-directional acoustic measurement (e.g., three mutually orthogonal axes, as shown in FIG. 2).

The distance (L) between transducers can be within the range of 1 to 100 cm, inclusive, according to some aspects of the present disclosure. Alternatively, L may be within the range of 20-25 cm, inclusive. Notably, L is not a trivial parameter: too large, and attenuation and beam spreading overly reduce the signal-to-noise; too small, and the overall acoustic travel time becomes short, thus reducing the precision of the resulting differential measurement.

The transducers (e.g., transducers 208, 210) can be narrow band transducers, according to some configurations. Even further, the narrow band transducers may be piezoelectric transducers. However, alternatively, a different type of transducer may be used. In some configurations, the transducers can operate at less than 15 volts peak-to-peak at center frequencies between 30 and 100 kHz, with a −3 dB full width fractional bandwidths between 1 and 10%. Transducers according to the present disclosure can achieve a sufficient signal-to-noise ratio using a narrow band continuous wave approach. This approach can be implemented, for example, with low noise analog amplifiers and a high-resolution analog phase detection circuit.

Figure 3:
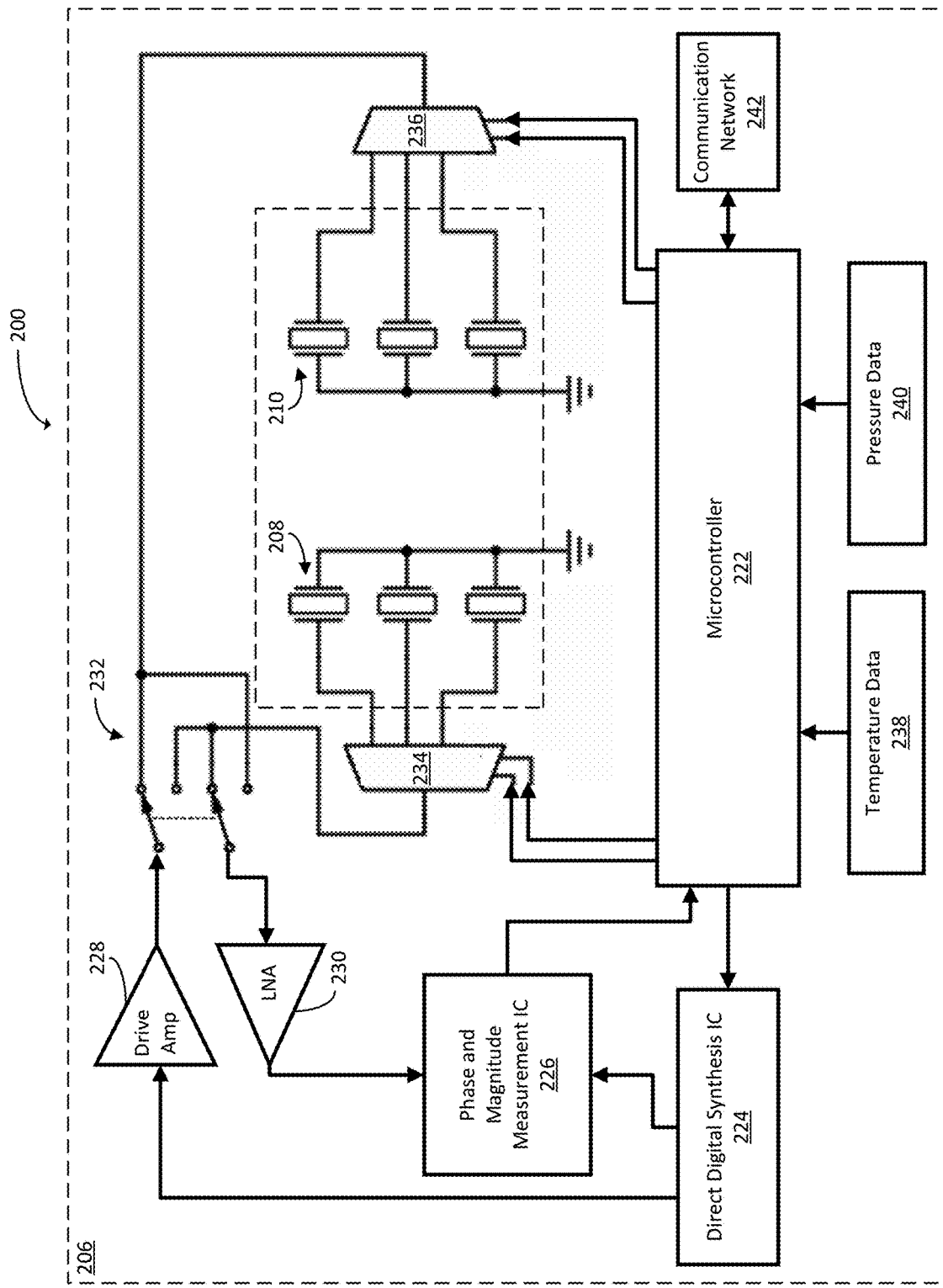
FIG. 3 is a block diagram of a control unit corresponding to the sonic anemometry system of FIG. 2, in accordance with the present disclosure.

Referring now to FIG. 3, a block diagram of one, non-limiting implementation of the sonic anemometry system 200 is provided, in accordance with aspects of the present disclosure. As will be described, a combination of low power elements can be implemented within the control unit 206, which reduces system weight, power, and complexity. As shown, the control unit 206 can include a microcontroller 222, which can provide signals to a direct digital synthesis integrated circuit (DDS IC) 224. In some configurations, the microcontroller 222 can receive signals from a phase and magnitude measurement integrated circuit (measurement IC) 226. The DDC IC 224 is shown to communicate with the measurement IC 226, and a drive amplifier 228. The measurement IC 226 is shown to receive signals from the DDC IC 224, and a low noise amplifier (LNA) 230.

The drive amplifier 228 and the LNA 230 can be connected to a polarity switch 232, which can be configured to alternately provide drive signals (from the drive amplifier 228) to multiplexer 234 and multiplexer 236. The polarity switch 232 can control which of the transducers (e.g., transducers 208, 210) are acting as emitters, and which of the transducers are acting as receivers.

When the drive amplifier 228 is connected to multiplexer 234, the corresponding set of transducers (here, shown to include transducer 208) can act as emitters. Conversely, the opposing set of transducers (here, shown to include transducer 210) can act as receivers. When functioning on the emitter side, multiplexer 234 can control which one of the plurality of emitting transducers is operating, via the select lines. Conversely, when functioning on the receiver side, multiplexer 234 can control which one of the receiving transducers is operating (and thus providing signals to the low noise amplifier 230), via the select lines. As shown, the microcontroller 222 can be configured to control the select lines, and thus which transducer is operating.

When the drive amplifier 228 is connected to multiplexer 236, the corresponding set of transducers (here, shown to include transducer 210) can act as emitters. Conversely, the opposing set of transducers (here, shown to include transducer 208) can act as receivers. When functioning on the emitter side, multiplexer 236 can control which one of the plurality of emitting transducers is operating, via the select lines. Conversely, when functioning on the receiver side, multiplexer 236 can control which one of the receiving transducers is operating (and thus providing signals to the low noise amplifier 230), via the select lines. As shown, the microcontroller 222 can be configured to control the select lines, and thus which transducer is operating. The use of multiplexers 234, 236 advantageously prevents cross talk between unpaired emitter and receiver transducers.

Still referring to FIG. 3, the microcontroller 222 is shown to receive temperature data 238 and pressure data 240. Additionally, the microcontroller 222 can be configured to send and receive data from a communication network 242.

In some configurations, drive signals are generated by the DDS IC 224, and phase lag between the transmitted and received signals can be measured using the measurement IC 226. The phase lag can be determined for multiple frequencies. The microcontroller 222 can be configured to sequence the transmission of tone bursts serially to each transducer. Additionally, the microcontroller 222 can collect and process the received signal from the transmitting transducer's pair to yield acoustic travel time for each direction. The method of processing can include temperature, pressure, and/or wake correction. The set of acoustic phase lags (including all transducer pairs) can be further analyzed to yield the 3-D wind vector, speed of sound, as well as an estimate of the air temperature and pressure. In some configurations, the sonic anemometer system 200 can provide these data outputs at a sampling frequency of up to 20 Hz.

In some configurations, the microcontroller 222 can include a memory. The memory can include any suitable storage device or devices that can be used to store instructions, values, image data, and the like, that can be used, for example, by the microcontroller to: control transducer selection via the multiplexers 234, 236; perform calculations involving phase and magnitude, among other things; perform corrections using variables such as temperature, pressure; provide power to the transducers via the drive amplifier 228; present content (e.g., flow measurements) using a display; communicate with one or more computing devices; and the like. The memory can include any suitable volatile memory, non-volatile memory, storage, or any of a variety of other suitable combination thereof. For example, the memory can include RAM, ROM, EEPROM, one or more flash drives, one or more hard disks, one or more solid state drives, one or more optical drives, and the like. In some configurations, the memory can have encoded thereon a program for controlling operation of the drive amp 228 and/or the selection bits of the multiplexers 234, 236. In such configurations, the microcontroller 222 can execute at least a portion of the program to generate data, transmit information and/or content to one or more computing devices, receive information and/or content from one or more computing devices, receive instructions from one or more devices (e.g., a personal computer, a laptop computer, a tablet computer, a smartphone, and the like), and the like.

In some configurations, the communication network 242 can send and receive data from various elements, such as a computing device or a server. The computing device and/or server can be any suitable computing device or combination of devices, such as a desktop computer, a laptop computer, a smartphone, a tablet computer, a wearable computer, a server computer, a virtual machine being executed by a physical computing device, etc.

Additionally, in some configurations, the computing device can include a processor, a display, one or more inputs, one or more communication systems, memory, and/or a GPU. The processor can be any suitable hardware processor or combination of processors, such as a central processing unit (CPU). In some configurations, the display can include any suitable display devices, such as a computer monitor, a touchscreen, a television, etc. In some configurations, the inputs can include any of a variety of suitable input devices and/or sensors that can be used to receive user input, such as a keyboard, a mouse, a touchscreen, a microphone, and the like.

In some configurations, the communication network 242 can be any suitable communication network or combination of communication networks. For example, the communication network 242 can include a Wi-Fi network (which can include one or more wireless routers, one or more switches, etc.), a peer-to-peer network (e.g., a Bluetooth network), a cellular network (e.g., a 4G network, a 5G network, etc., complying with any suitable standard, such as CDMA, GSM, LTE, LTE Advanced, WiMAX, etc.), a wired network, etc. In some configurations, the communication network 242 can be a local area network, a wide area network, a public network (e.g., the Internet), a private or semi-private network (e.g., a corporate or university intranet), other suitable type of network, or any suitable combination of networks. Additionally, in some configurations, the communication network 242 can include a universal asynchronous receiver-transmitter (UART) device for asynchronous serial communication. Communications links can each be any suitable communications link or combination of communications links, such as wired links, fiber optic links, Wi-Fi links, Bluetooth links, cellular links, etc.

In some configurations, a communications system can be provided for communicating information over the communication network 242. Such a communications system can include a variety of suitable hardware, firmware, and/or software for communicating information over the communication network 242 and/or any other suitable communication networks. For example, the communications system can include one or more transceivers, one or more communication chips and/or chip sets, etc. In a more particular example, the communications systems can include hardware, firmware and/or software that can be used to establish a Wi-Fi connection, a Bluetooth connection, a cellular connection, an Ethernet connection, etc.

In some configurations, the source of the temperature data 238 can be any of a variety of suitable sources, such as a thermometer, a thermocouple, a thermistor, or a computing device (e.g., a server storing temperature data, and the like. Similarly, the source of the pressure data 240 can be any of a variety of suitable sources, such as a barometer (e.g., electronic barometer, electronic resistance or capacitance barometer, aneroid mechanical barometer), or a computing device (e.g., a server storing pressure data), and the like. In some configurations, the temperature and/or pressure data sources can be local to the sonic anemometer system 200. As an example, the temperature and pressure data sources can be connected to the microcontroller 222 by a cable, a direct wireless link, or the like. Additionally or alternatively, in some configurations, the temperature and pressure data sources can be located remotely from the microcontroller 222, and can communicate data to the microcontroller 222 via a communication network (e.g., the communication network 242).

Figure 4:
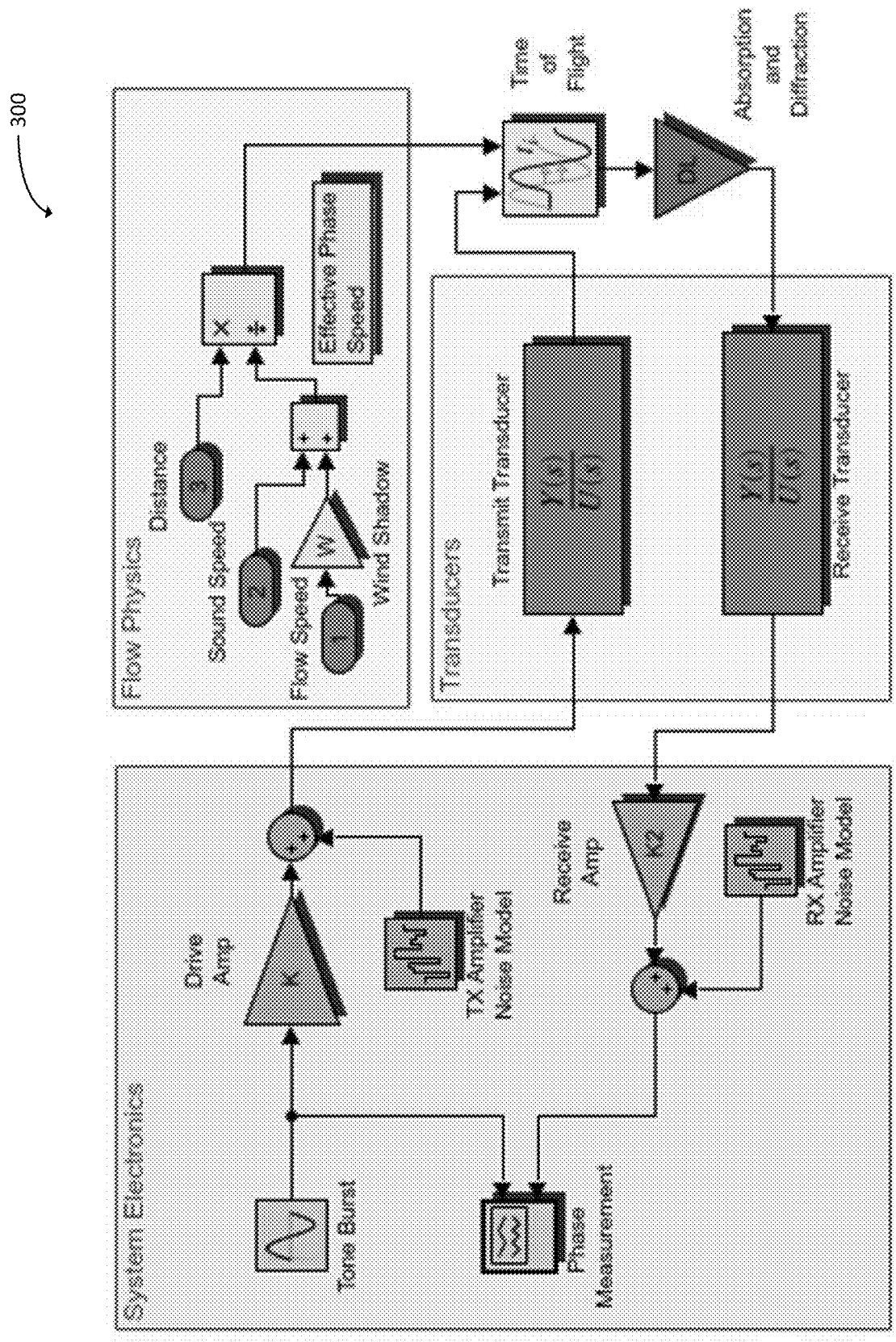
FIG. 4 is a simulation diagram corresponding to the sonic anemometry system of FIG. 2, in accordance with the present disclosure.

Referring now to FIG. 4, a simulation diagram 300 of system 200 is shown, according to aspects of the present disclosure. In some configurations, the microcontroller 222 can perform all or some of the calculations associated with the simulation diagram 300. As shown, the simulation diagram 300 includes transducer models, acoustic diffraction, absorption, and time of flight, amplifier models, noise models, and phase measurement. In order to maximize system accuracy, the present disclosure includes compensation algorithms to reduce sensitivity to temperature, pressure, and wake. The end-to-end transmission mode transfer function for the sonic anemometer system 200 (represented via simulation diagram 300) can be written as:

$$\frac{V_{out}(j\omega)}{V_{in}(j\omega)} = \underbrace{\frac{1}{C_{fb}} D_L \Phi_{RX} Y_a^{RX}(j\omega)}_{\text{Receive Transducer and Preamp}} \underbrace{\frac{\rho_0}{2\pi} \Phi_{TX} Y_a^{TX}(j\omega)}_{\text{Transmit Transducer}} \underbrace{\frac{je^{j(\omega t - kr)} e^{-\alpha r}}{r}}_{\substack{\text{Time of Flight,} \\ \text{Spreading,} \\ \text{and Absorption}}} \quad (3)$$

Referring to Equation 3, acoustic diffraction is included as DL, and geometric spreading, time of flight, and acoustic absorption are included in the last term. Acoustic absorption can depend on frequency, pressure, and temperature. Diffraction can be frequency dependent, and dependent on sound speed. The transducer models (transmit/emit and receive) can include parameters that are functions of temperature and weaker functions of environmental pressure.

Figure 5:
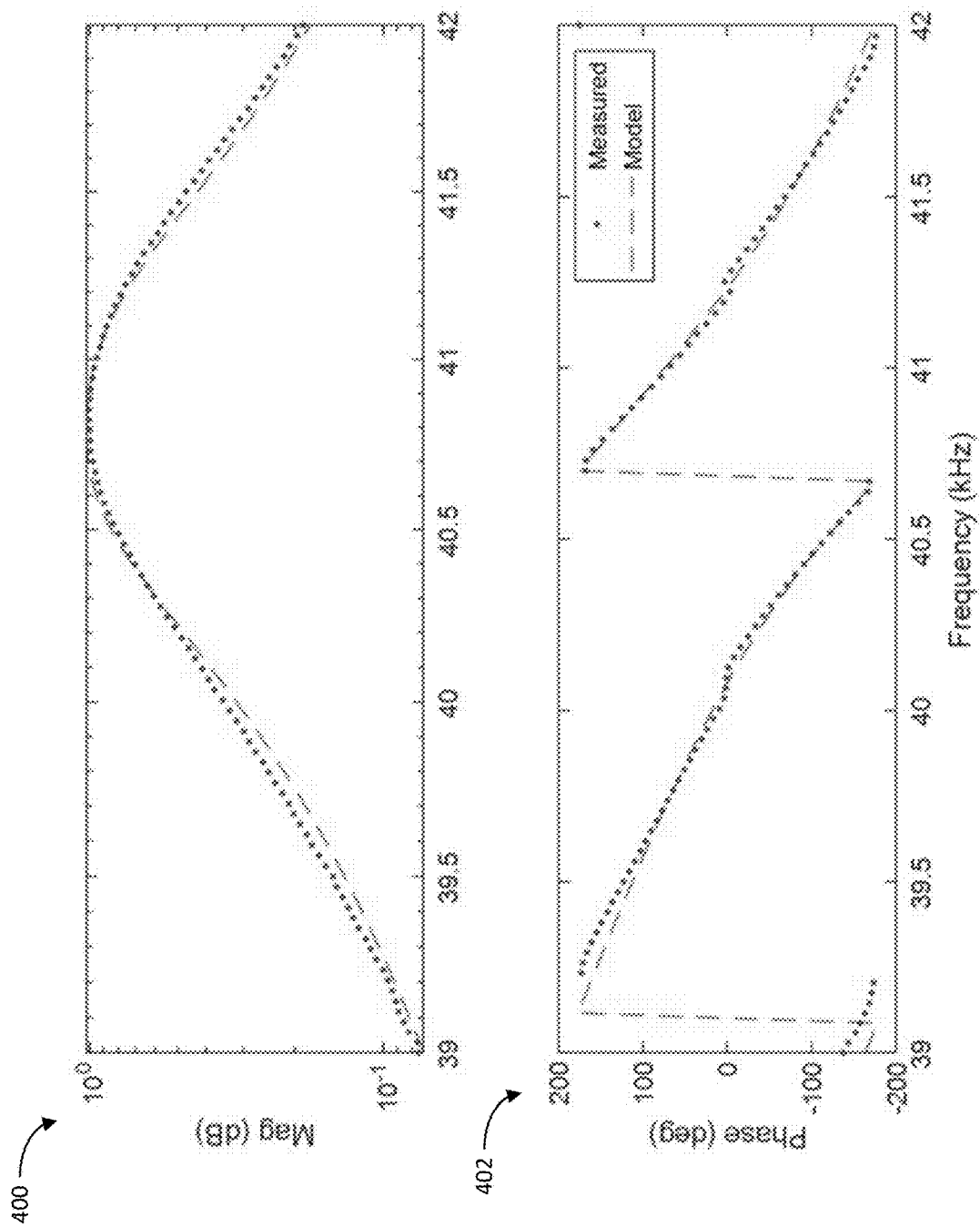
FIG. 5 is a simulated transmission mode measurement corresponding to FIG. 4, in accordance with the present disclosure.

Referring now to FIG. 5, a simulated transmission mode measurement corresponding to FIG. 4 is provided, in accordance with the present disclosure. As shown, the measured magnitude (shown via plot 400) and the measured phase (shown via plot 402) closely track the corresponding model values.

Figure 6:
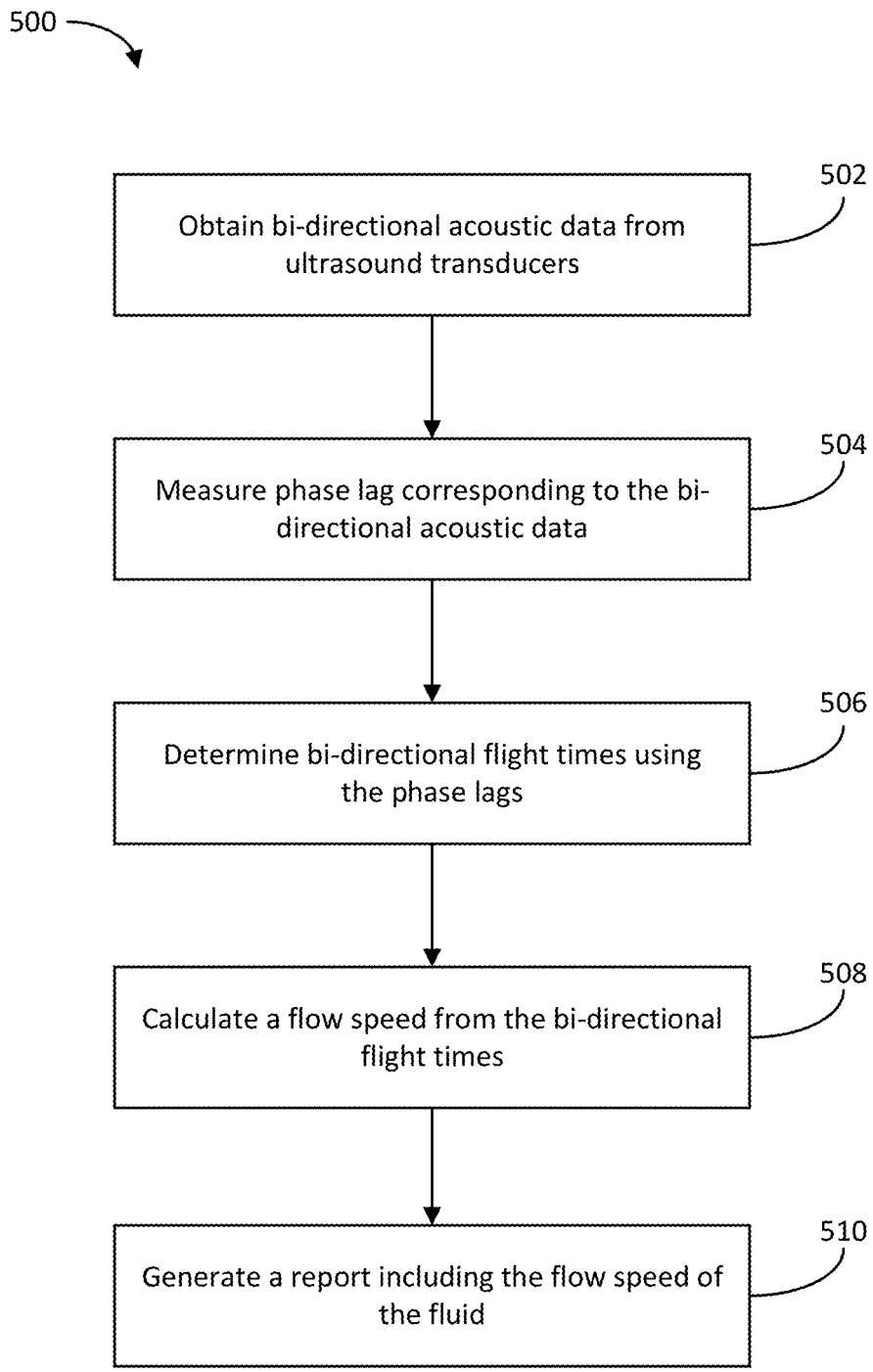
FIG. 6 is a process diagram for a method of determining a flow speed, in accordance with the present disclosure.

Referring to FIG. 6, a method 500 for measuring flow speed is shown, in accordance with one aspect of the present disclosure. In some configurations, the method 500 can be performed using the sonic anemometry system 200, as shown and described herein. Method 500 is shown to include obtaining bi-directional acoustic data from ultrasound transducers (process block 502). In some configurations, obtaining the bi-directional acoustic data can occur as a fluid moves relative to the ultrasound transducers. Further, method 500 is shown to include measuring phase lag corresponding to the bi-directional acoustic data (process block 504). In some configurations, the method 500 can include determining bi-directional flight times corresponding to the transducers, using the phase lag (process block 506). The method 500 is shown to include calculating a flow speed from the bi-directional flight times (508). Lastly, the method 500 is shown to include generating a report including the flow speed of the fluid (process block 510). In some configurations, compensation methods can be applied to the method 500, to compensate for one or more of temperature, pressure, and wake effects.

Compensation Methods

Figure 7:
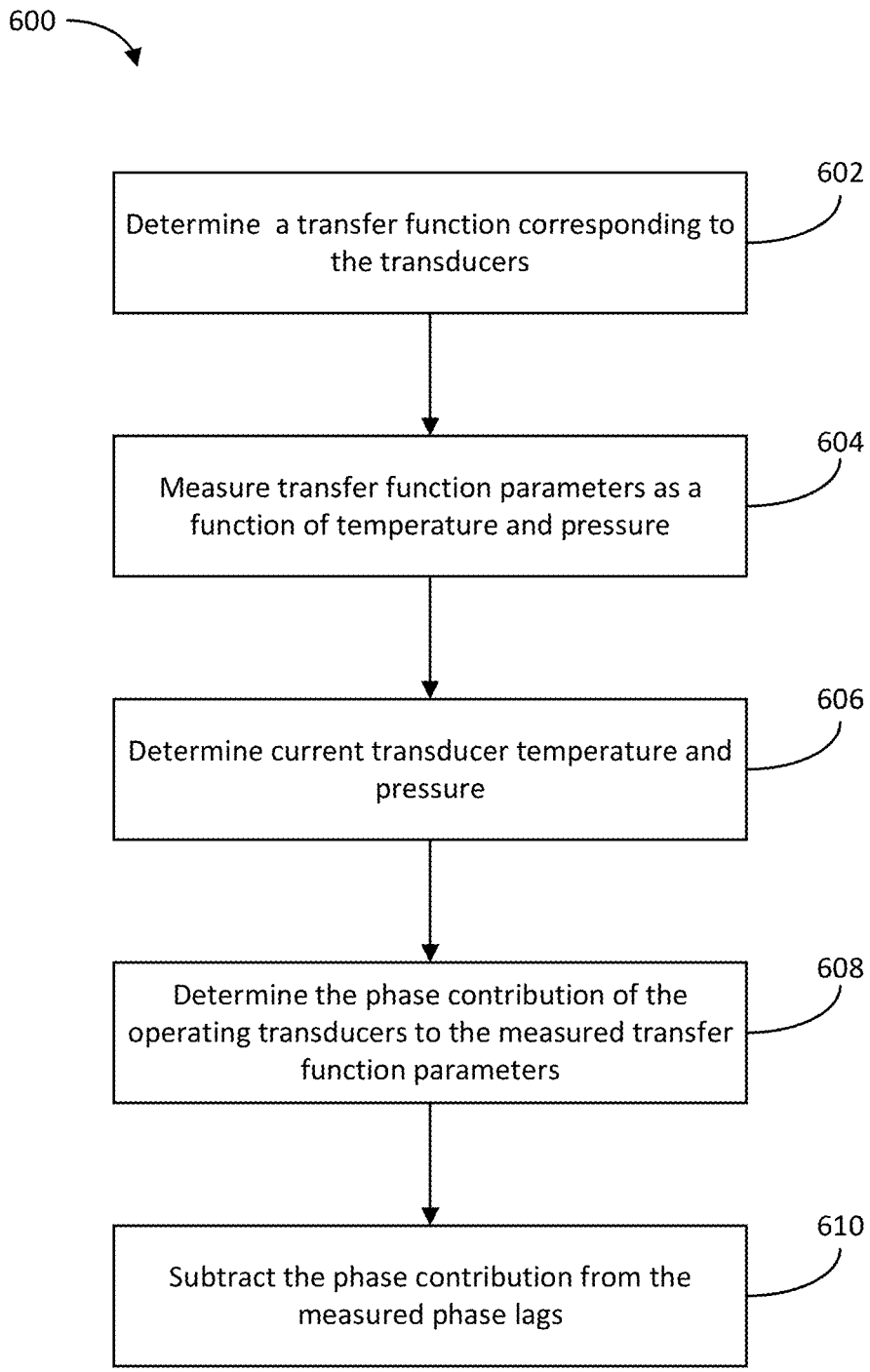
FIG. 7 is a process diagram for a method of compensating for the effects of temperature and pressure during flow speed measurements.
Figure 8:
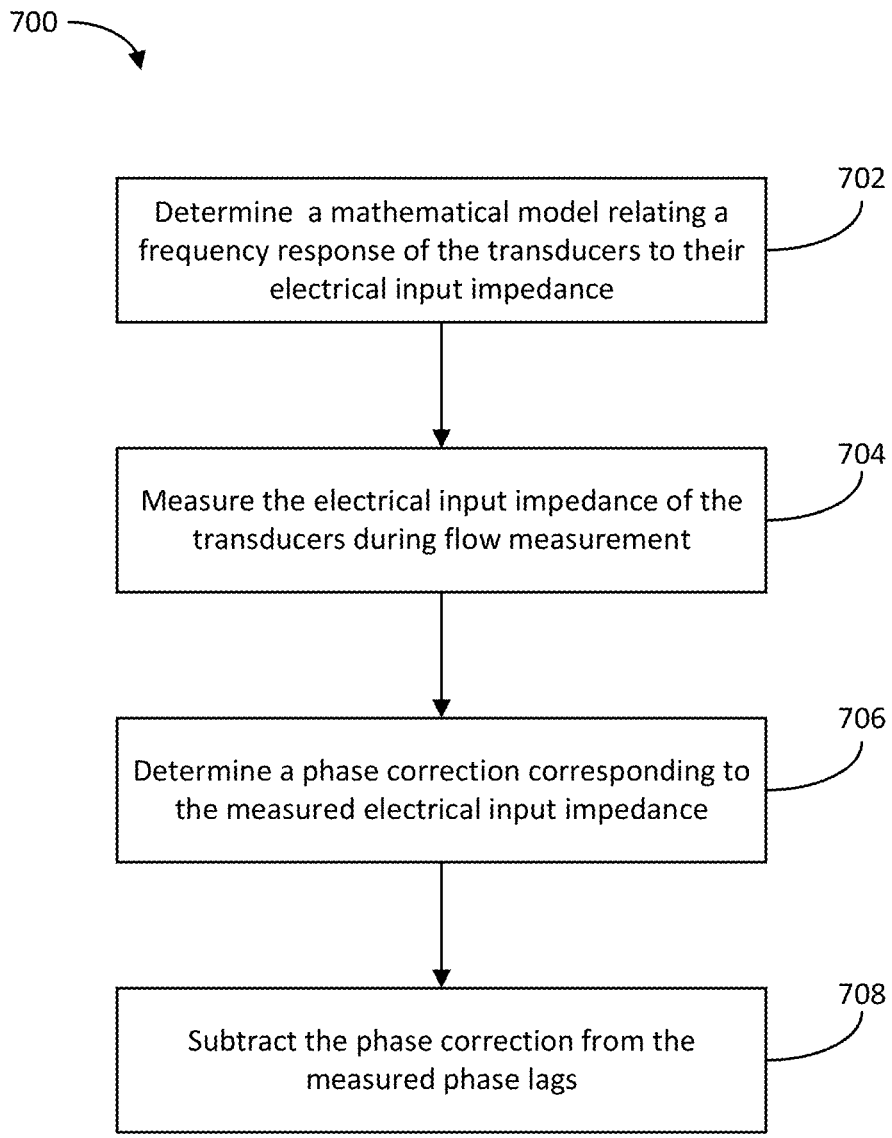
FIG. 8 is a process diagram for another method of compensating for the effects of temperature and pressure during flow speed measurements.

As discussed above, the present disclosure includes compensation methods to reduce sensitivity to temperature, pressure, and wake. Referring to FIGS. 7 and 8, two methods are provided for temperature and pressure compensation.

Specifically referring to FIG. 7, a method 600 of compensating for temperature and pressure for flow speed measurements is shown, in accordance with the present disclosure. In some configurations, the method 600 can be performed using the sonic anemometry system 200, as shown and described herein. Method 600 is shown to include determining a transfer function corresponding to the transducers (process block 602). Method 600 is shown to further include measuring transfer function parameters as a function of temperature and pressure (process block 604). Additionally, method 600 can include determining the current transducer temperature and pressure (process block 606). In some configurations, this determination can include receiving a temperature measurement from a temperature sensor proximate to the sonic anemometer system, receiving a pressure measurement from a pressure sensor, and/or deriving magnitude and frequency data from the bi-directional acoustic data of the transducers. Method 600 is shown to include determining the phase contribution of the transducers, based on the current transducer temperature and pressure, to the measured transfer function parameters (process block 608). Method 600 is shown to further include subtracting the phase contribution from the measured phase lag (process block 610). Further, the method 600 can include generating a report that includes an adjusted phase lag, based on subtracting the phase contribution from the phase lag. In some configurations, method 600 can be implemented prior to determining a flow speed from the bi-directional acoustic data.

Specifically referring to FIG. 8, a second method (method 700) of compensating for temperature and pressure for flow speed measurements is shown, in accordance with the present disclosure. In some configurations, the method 700 can be performed using the sonic anemometry system 200, as shown and described herein. Method 700 is shown to include determining a mathematical model relating a frequency response of the system transducers to their electrical input impedance (process block 702). Method 700 is shown to further include measuring the electrical input impedance of the transducers during flow measurement (process block 704). Additionally, method 700 can include determining a phase correction corresponding to the measured electrical input impedance (process block 706). Method 700 can further include subtracting the phase correction from the measured phase lag (process block 708). Further, the method 700 can include generating a report that includes an adjusted phase lag, based on subtracting the phase correction from the phase lag. In some configurations, method 700 can be implemented prior to determining a flow speed from the bi-directional acoustic data.

The method 700 can include measuring the input impedance of each transducer as a function of frequency in situ. The input impedance is related to the transmit and receive transfer functions. In some configurations, the input impedance can be modeled according to Equation 4

$$Z(j\omega) = \frac{V(j\omega)}{I(j\omega)} = R + \frac{1}{Cj\omega + \Phi^2 Y_a(j\omega)} \quad (4)$$

where R and C are the series resistance and parallel capacitance, $\Phi$ is the electro-mechanical coupling, and $Y_a(j\omega)$ is the mechanical admittance of the transducer as a function of circular frequency, w. By measuring Z, $Y_a$ can be determined. In some configurations, this is the same $Y_a$ that appears in the acoustic transmission model of Equation 3. Thus, once Z is measured, and $Y_a$ determined, the phase contribution to the transmission model of Equation 3 can be directly computed and subtracted from the result to correct for temperature and pressure dependent transducer errors.

As mentioned above, the present disclosure includes compensation methods for self-wind-shadowing (wake effects) of a sonic anemometry system (e.g., sonic anemometry system 200). The geometry of the anemometer frame affects the flow velocity along the measured acoustic path of the transducers by creating localized wind shadows. To reduce and characterize these shadows, the flow past the frame can be both modeled using computational fluid dynamics (CFD), and tested at operating conditions in a wind tunnel (or, alternatively, in a water tunnel while using similar variable).

Given that the sonic anemometry system responds to flow speed in the acoustic path between the transducers, the time delay of the acoustic transmission can be computed via Equation 5

$$\tau = \int_0^R \frac{ds}{c + \vec{v}(s) \cdot \hat{s}} \quad (5)$$

where the tangential component of flow speed modifies the phase velocity along the acoustic path. Wake, or wind shadowing, effects will thus tend to cause the measured flow velocity, v, to be somewhat less than the free stream velocity, I/y, as shown in Equation 6:

$$\vec{v} = \vec{U}_\infty \cdot \vec{W}(\theta, \psi, |\vec{U}_\infty|) \quad (6)$$

where the "wake function", W(θ, Y), is a function of the incoming direction of the external flow, denoted by the circumferential and elevation angles, and the speed of the flow.

Experimentally, a rotation angle of the sonic anemometry system can be changed while elevation remained fixed. Once the wake function is known, it can be compensated by application of the inverse, as shown by Equation 7:

$$\vec{U}_\infty = \vec{v} \cdot \vec{W}^{-1}(\theta, \psi, |\vec{U}_\infty|) \quad (7)$$

Alternatively, computational fluid dynamics simulations using direct numerical simulation (DNS) scheme flow measurements can be used to determine the compensating wake function, W. Using a low-density target atmosphere and a transducer diameter of 10 mm, the present disclosure yields Reynolds numbers of, at most, 250. The low Reynolds number allows for direct numerical simulation with an unstructured mesh size 1 mm (and no Reynolds averaging or turbulence models required). This creates a tractable problem which can run on available resources in a matter of hours, until a converged flow speed and direction are obtained.

The geometry can be similar to the canonical problem of the cylinder in cross-flow. At a Reynolds number between ~50-200 laminar vortex shedding of the classic von Karman vortex street is expected. Above 200, more complex three-dimensional instabilities may be observed. The Strouhal number for a cylinder in cross-flow at these Reynolds numbers is between 0.13 to 0.2, indicating a shedding frequency of 130-200 Hz at 10 m/s flow speed. The shedding can thus be captured using a 0.1 ms time step, as in CFD results shown in FIG. 18.

Sonic Anemometer Example Testing Via Mars Simulation Tunnel

Referring now to FIGS. 9-18, a twelve transducer sonic anemometer was built and tested under Martian atmospheric conditions, in accordance with aspects of the present disclosure. As briefly discussed above, studying the atmospheric conditions on Mars can be particularly challenging. Often, anemometers designed for atmospheric testing on earth do not meet the operating requirements for obtaining meaningful data on Mars.

Turbulent eddies are the dominant mechanism by which heat, momentum, and molecules are transferred between the surface and the atmosphere. On Mars, we have yet to fully quantify and understand these processes, however, measurements close to the surface (e.g., 1.5 m altitude) at 10-20 Hz and with a sensitivity of 5 cm/s is advantageous to capturing the dominant components of the turbulent eddy spectrum.

The presently disclosed systems and methods can provide ~20× faster, more sensitive and precise measurements than any anemometer that has previously flown to Mars. Further, the present disclosure enables direct measurement of the turbulent eddies, and thus their surface-atmosphere exchanges. These measurements can advance understanding of Aeolian processes, saltation, dust lifting, the energy balance of the diurnal convective layer, and the stability of water in the subsurface, among other things.

Figure 9:
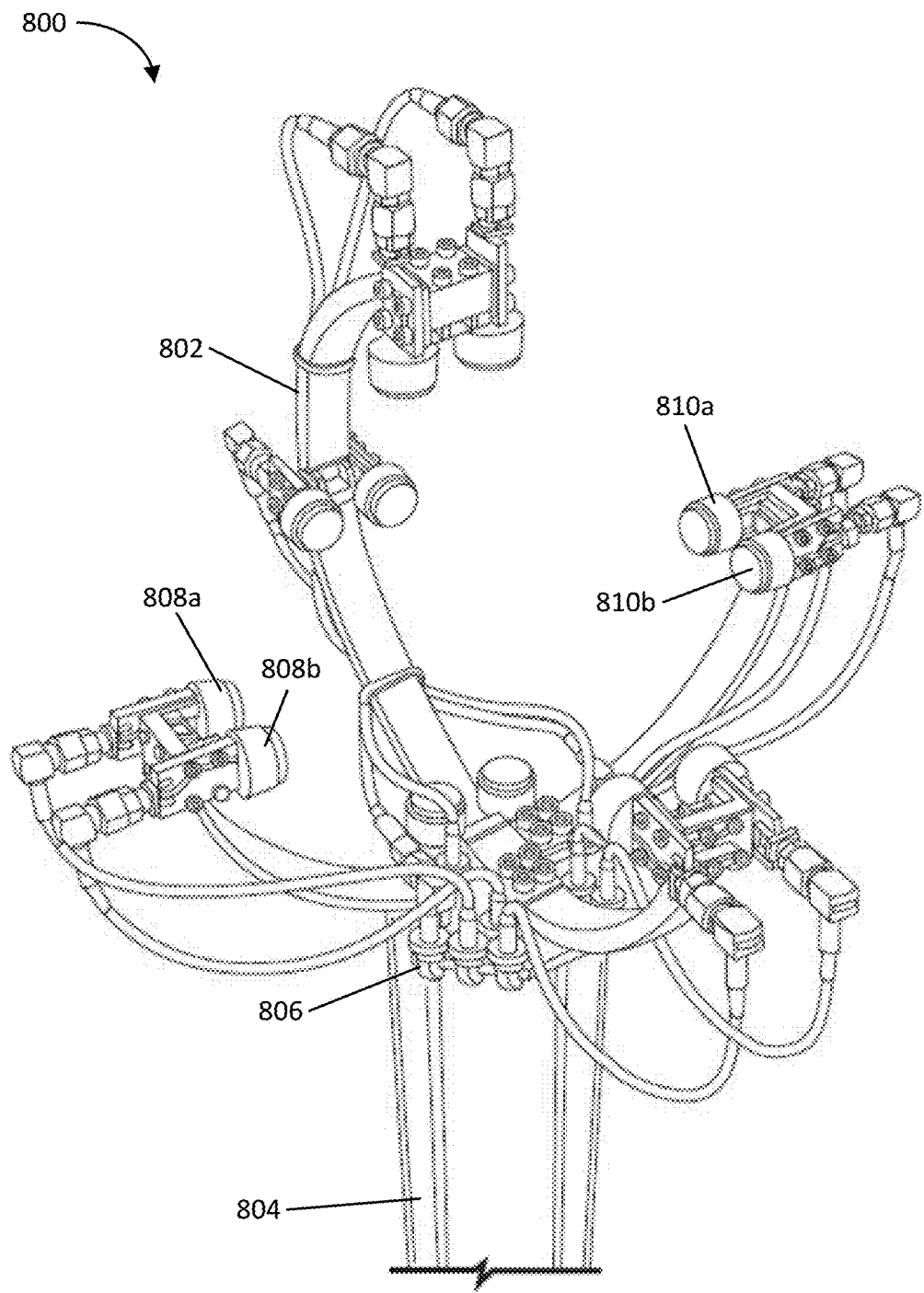
FIG. 9 is an example sonic anemometry system, in accordance with the present disclosure.

Referring specifically to FIG. 9, a sonic anemometry system 800 is shown. The sonic anemometry system 800 was constructed in accordance with the sonic anemometry system shown and described in FIGS. 2-4. Notably, however, sonic anemometry system 800 included twelve transducers (as compared to six), although the principles of operation generally remain the same. As shown, the sonic anemometry system 800 included a spherical frame 802 supported by a mast 804. Transducer pairs were positioned opposite one another (e.g., transducer 808a is positioned opposite transducer 810a, and transducer 808b is positioned opposite transducer 810b), defining three orthogonal axes of bi-directional acoustic measurement. Shielded cables extended from each transducer to a respective connector (e.g., connector 806), which were disposed at the bottom of the spherical frame 802.

The transducers (e.g., transducers 808a, 808b, 810a, 810b) used were narrow band piezoelectric transducers from PUI audio, operating at less than 15 V peak-to-peak at frequencies between 40.3 and 41.1 kHz, with a −3 dB bandwidth between 1.2 and 1.6 kHz. Specifically, the transducers used were PUI UTR-1440K-TT-R piezoelectric elements. These transducers were able to achieve a sufficient signal-to-noise ratio using a narrow band continuous wave approach. with low noise analog amplifiers and a high-resolution analog phase detection circuit. The distance between paired transducers was 12±0.4 cm. This corresponded to an effective acoustic path length of 11.7±0.7 cm.

Referring to FIGS. 7 and 8, a testing configuration 830 is shown to include a tunnel 820 having housing 822. The sonic anemometry system 800 was affixed within the tunnel 820, at the indicated "mount point." For the purposes of testing, the Mars Simulation Wind Tunnel (located at the University of Aarhus, Denmark) was used.

The Mars Simulation Wind Tunnel ("tunnel") has an inner diameter of 2 meters. Flow is driven using dual vertical fans, and recirculated back around the periphery. Vanes and a screen upstream of the test section reduce turbulence. A maximum flow speed of approximately 15 m/s is achievable at 6 mbar in $CO_2$. The tunnel was first sealed, pumped out to less than 0.1 mbar, and backfilled with dry $CO_2$ to test pressures in the 2-20 mbar range. The target pressure for Mars-like operation is 6 mbar, although pressure varies with altitude. Operating pressure was measured using a Pfeiffer Vacuum model APR 250 (0.1-1000 mbar, +2%). Absolute minimum pressure was determined with a Pirani type Pfeiffer TPR 280. A cold plate at −80° ° C. upstream of the test section was used to freeze out any residual water vapor in the flow. A Honeywell HIH-4602-C was used to monitor water vapor. At all times, H2O content was less than 500 ppm by pressure. Gas temperature is monitored by two PT100 RTDs hanging in the flow.

Figure 11:
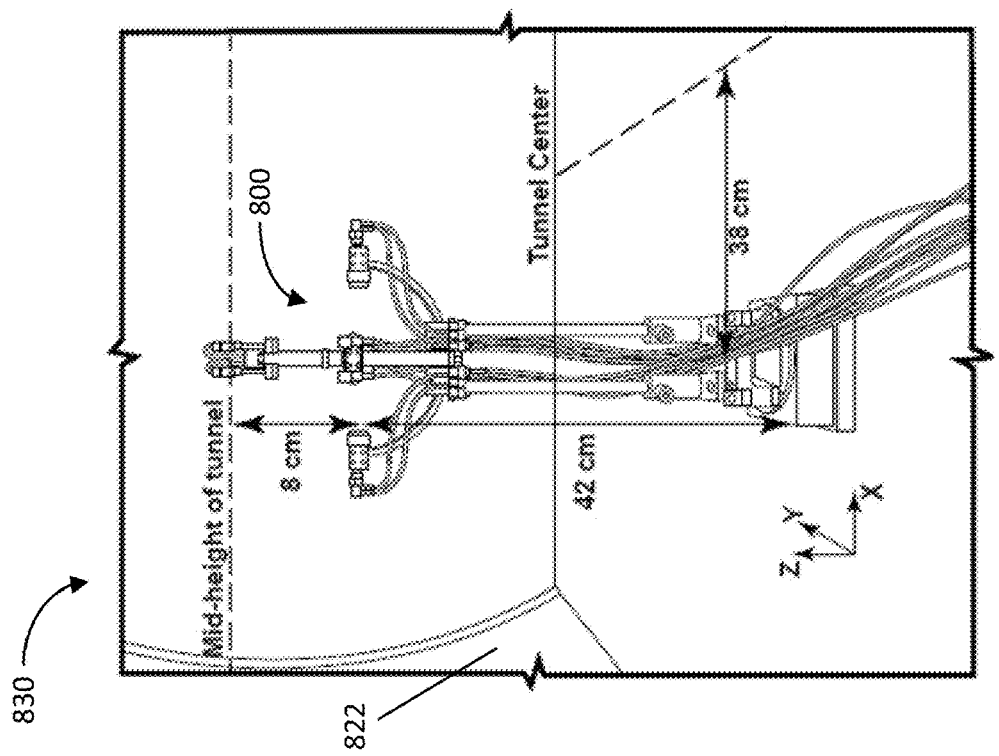
FIG. 11 is an example testing configuration for a sonic anemometry system, in accordance with the present disclosure.
Figure 10:
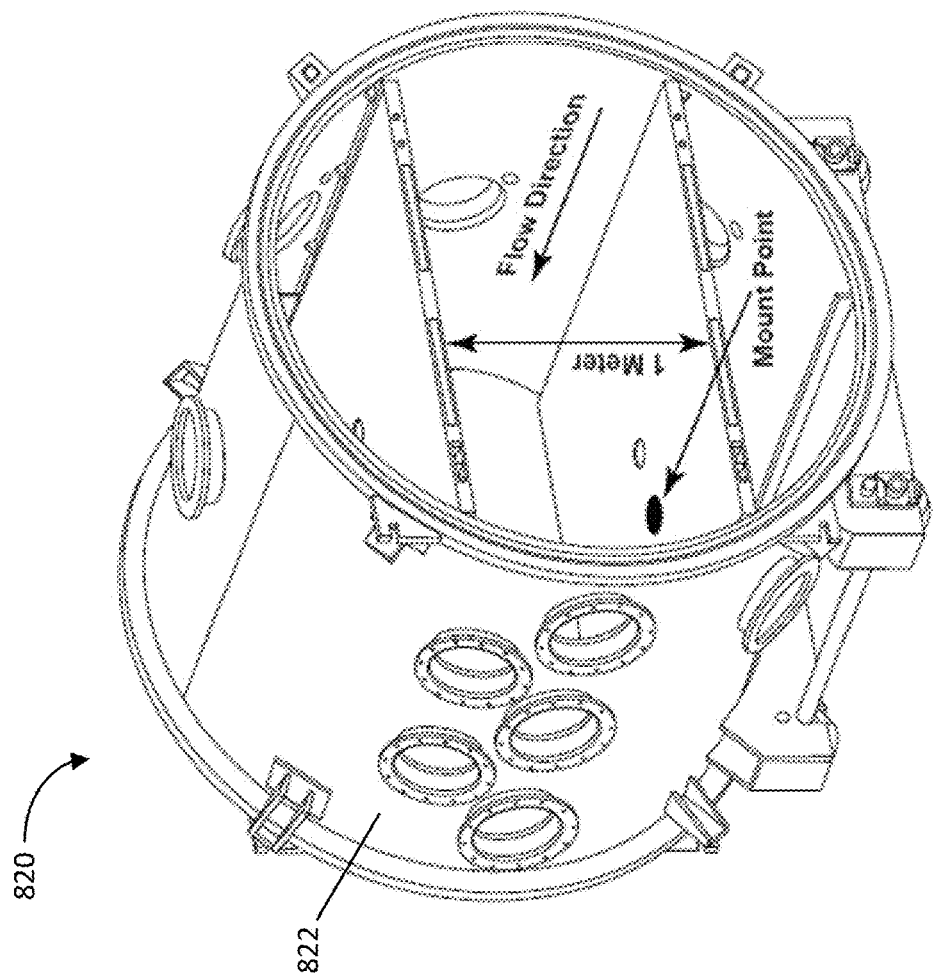
FIG. 10 is an example testing environment for a sonic anemometry system, in accordance with the present disclosure.

The tunnel is divided by two horizontal plates, 1 meter apart vertically. As shown in FIG. 11, the sonic anemometry system 800 was mounted to the left of center (looking down the tunnel), on the base plate. The anemometer center point was positioned 38 cm horizontally offset from the tunnel center, putting it 52 cm from the nearest wall, and 42 cm above the floor, thus placing the center of the anemometer 8 cm below the tunnel midplane (when not tilted).

Flow in the tunnel is measured using a two dimensional FlowLite laser Doppler anemometry (LDA) system from DanTec Dynamics. The flow is seeded with 1-8 micron diameter glass tracers. The LDA system is focused through one of the side windows and measures flow speed upstream of the anemometers. It is able to measure flow in the axial (Y) and vertical (Z) directions. Flow is primarily in the Y direction, although the sonic anemometer data shows an approximately 8.2° skew of the flow towards the −X direction at 6 mbar. This skew was also measured by previous experiments in the tunnel. Accordingly, the skew was taken into account when processing the flow field data to compare LDA to the sonic anemometer system 800. After the sonic anemometer system 800 was removed from the tunnel, a series of flow experiments were conducted to measure the flow speed as a function of pressure and fan speed at the anemometer mount location. The ratio between the upstream measured flow speed and the flow speed at the anemometer mount location was also taken into account when processing the LDA data. Hence, LDA data reported herein is the estimated flow speed at the anemometer location with the sonic anemometer system 800 removed (i.e., directly comparable to flow that is measured with the sonic anemometer system 800).

A motion control system consisting of a Newport BGM80CC goniometer (+/−45° tilt) on top of a Newport 495CC rotation stage (±173° rotation) was utilized to rotate and tilt the spherical frame 802 in the flow. Rotation is about the vertical tunnel axis. Tilt is about the horizontal axis relative to the rotation stage (at 0° rotation, this axis goes across the tunnel). The spherical frame 802 was mounted so that at 0° tilt and 0° rotation, the Y-axis of the spherical frame 802 was aligned with the tunnel axis, the Z-axis was aligned vertically, and the X-axis was aligned across the tunnel.

Figure 12A:
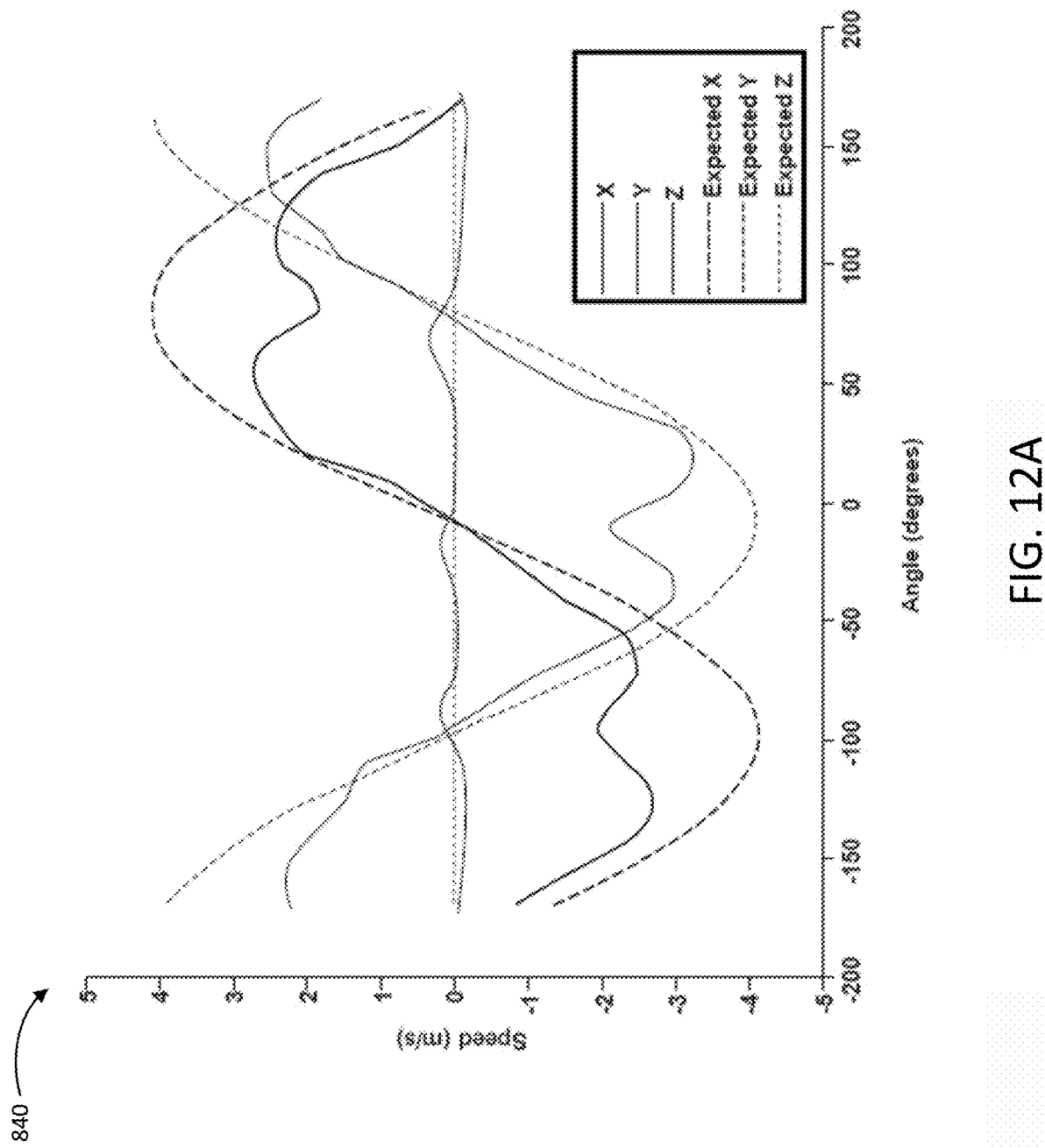
FIG. 12A is a graph of expected and measured speed corresponding to the testing configuration of FIG. 11, in accordance with the present disclosure.
Figure 12B:
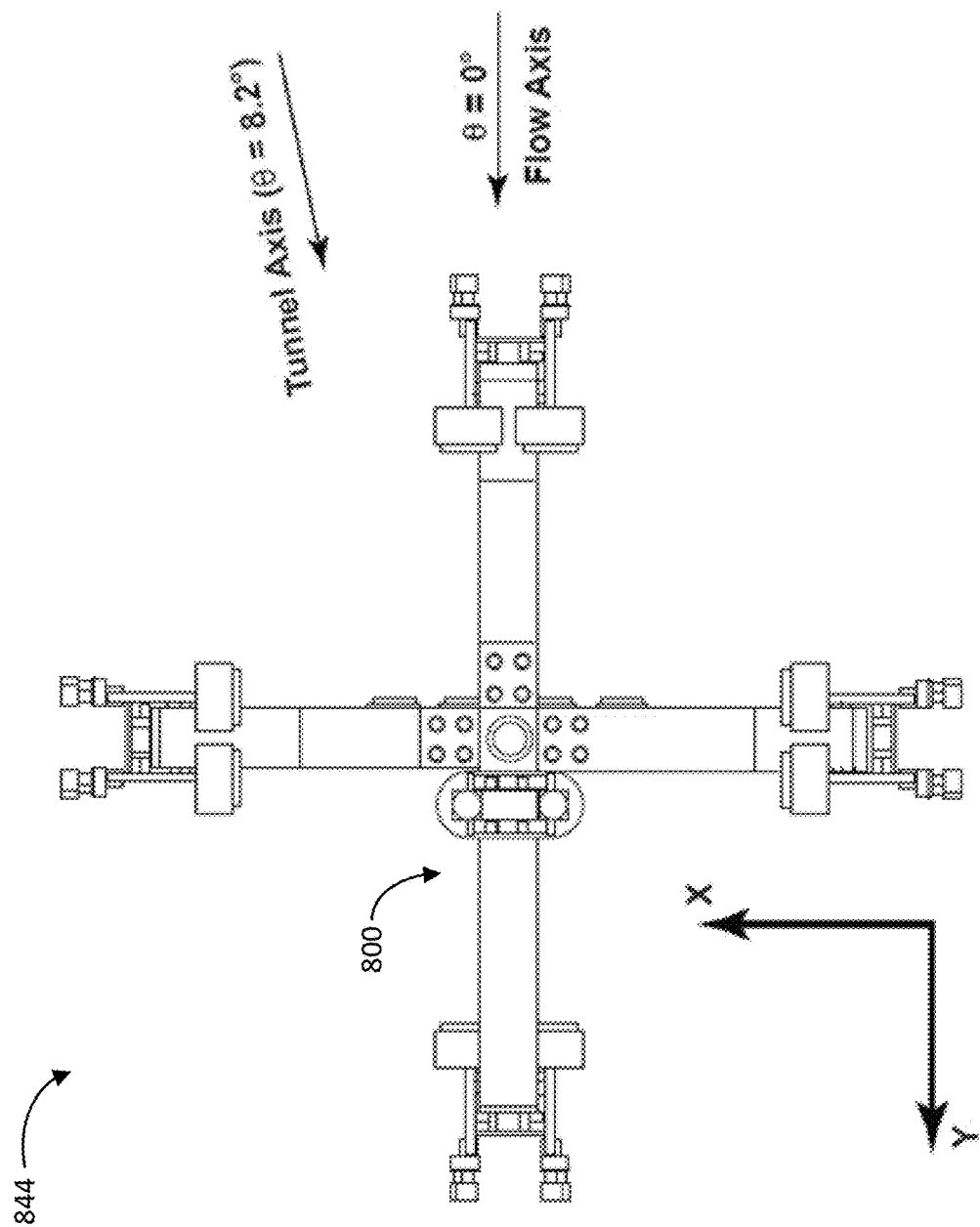
FIG. 12B is a diagram showing further detail of the testing configuration of FIG. 11, in accordance with the present disclosure.

As discussed above, the anemometer frame (e.g., spherical frame 802) creates a wake pattern that can be calibrated against flow angle in order to correctly measure the free stream flow velocities. FIGS. 9A-9D outline this effect, and the results of compensation. Referring specifically to FIGS. 12A and 12B, a graph 840 (FIG. 12A) shows the wake as a function of angle as the anemometer steps through a #170° rotation in 10° steps, with FIG. 12B showing a position 844 of the sonic anemometer system 800 within the tunnel 820. Data is at 6.1 mbar in $CO_2$, 23° C. in a 4.1 m/s flow. In the graph 840, each plotted data point is the average of 20 data points taken at each dwell angle. The "expected" curves show the results presuming no shadowing based on LDA flow speed measurement. The expected overall shape (cosine, sine) and magnitude (4.1 m/s) are evident in the data. There is a clear "dip" in the measured velocity near 0-0 (for Y) and near 0=90° (for X). This is when the arm of the spherical frame 802 passes through the flow. The Z-axis should show no flow, as is observed. The small (0.3 m/s) positive Z direction flow near 0=0, 0=+/−90° as the main arms pass through the flow may be due to updraft caused by the fluid dynamics of the flow interacting with the spherical frame 802.

Figure 12D:
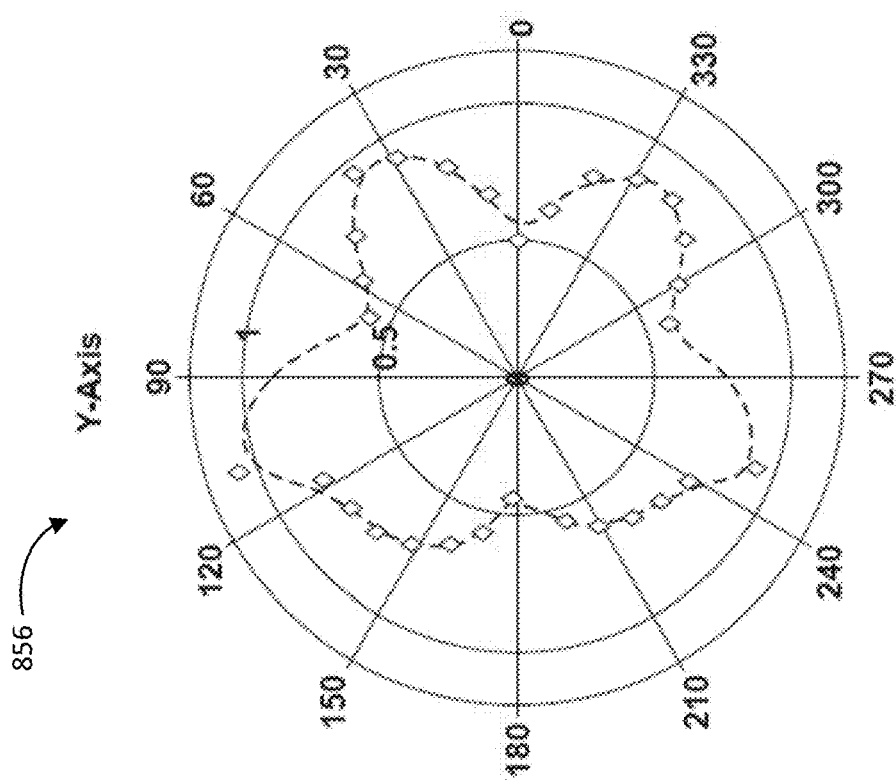
FIG. 12D is a polar plot of the data of FIG. 12A corresponding to the y-axis, in accordance with the present disclosure.
Figure 12C:
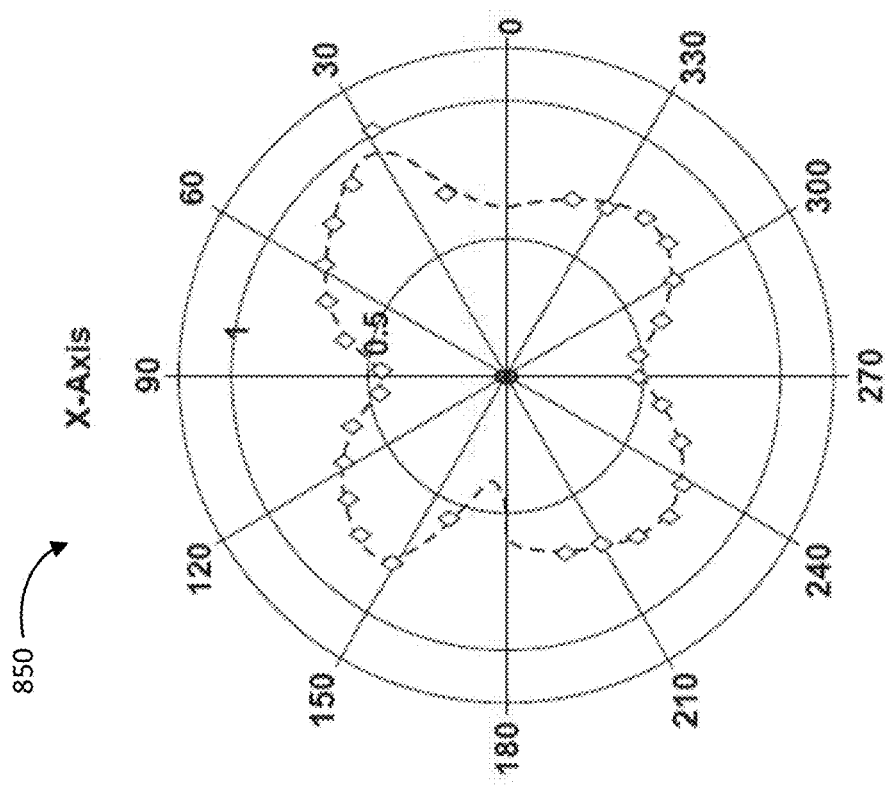
FIG. 12C is a polar plot of the data of FIG. 12A corresponding to the x-axis, in accordance with the present disclosure.

Referring specifically to FIGS. 12C-12D, the ratio between the expected flow and measured flow are plotted in polar plots. FIG. 12C includes a polar plot 850 corresponding to the x-axis, and FIG. 12D includes a polar plot 856 corresponding to the y-axis. As shown, the ratio approaches 1 near 45°. There are dips in the ratio near 0°, ±90°, and 180° as expected due to the wake of the arms. A smoothed spline fit is recorded for each axis. This fit can be used to correct flow data for wake effects. Note that the wake effects here have only been calibrated at 0° tilt. Additional calibrations can be conducted at other tilt angles.

Figure 13:
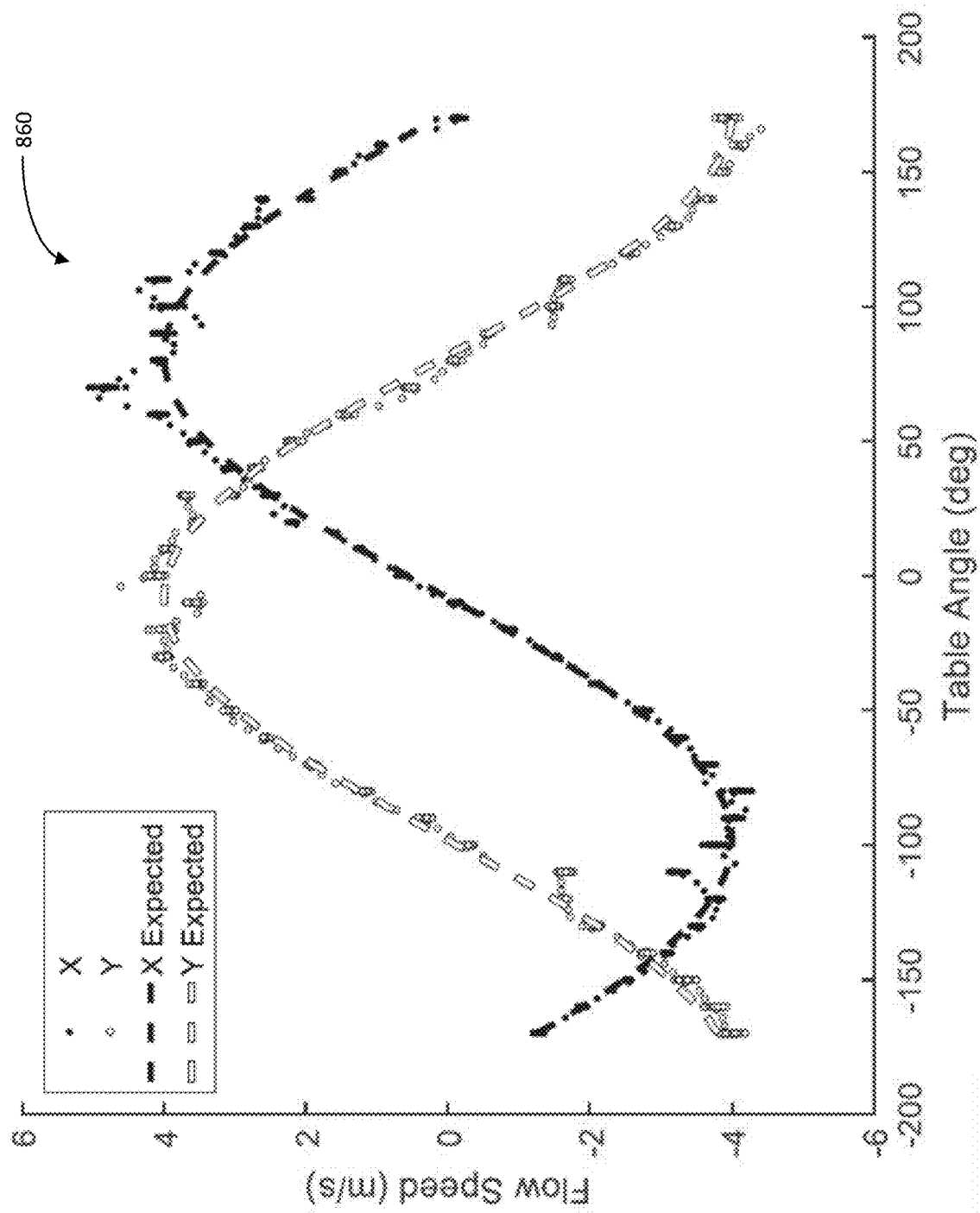
FIG. 13 is a graph of flow testing results as corrected for wake, in accordance with the present disclosure.
Figure 14:
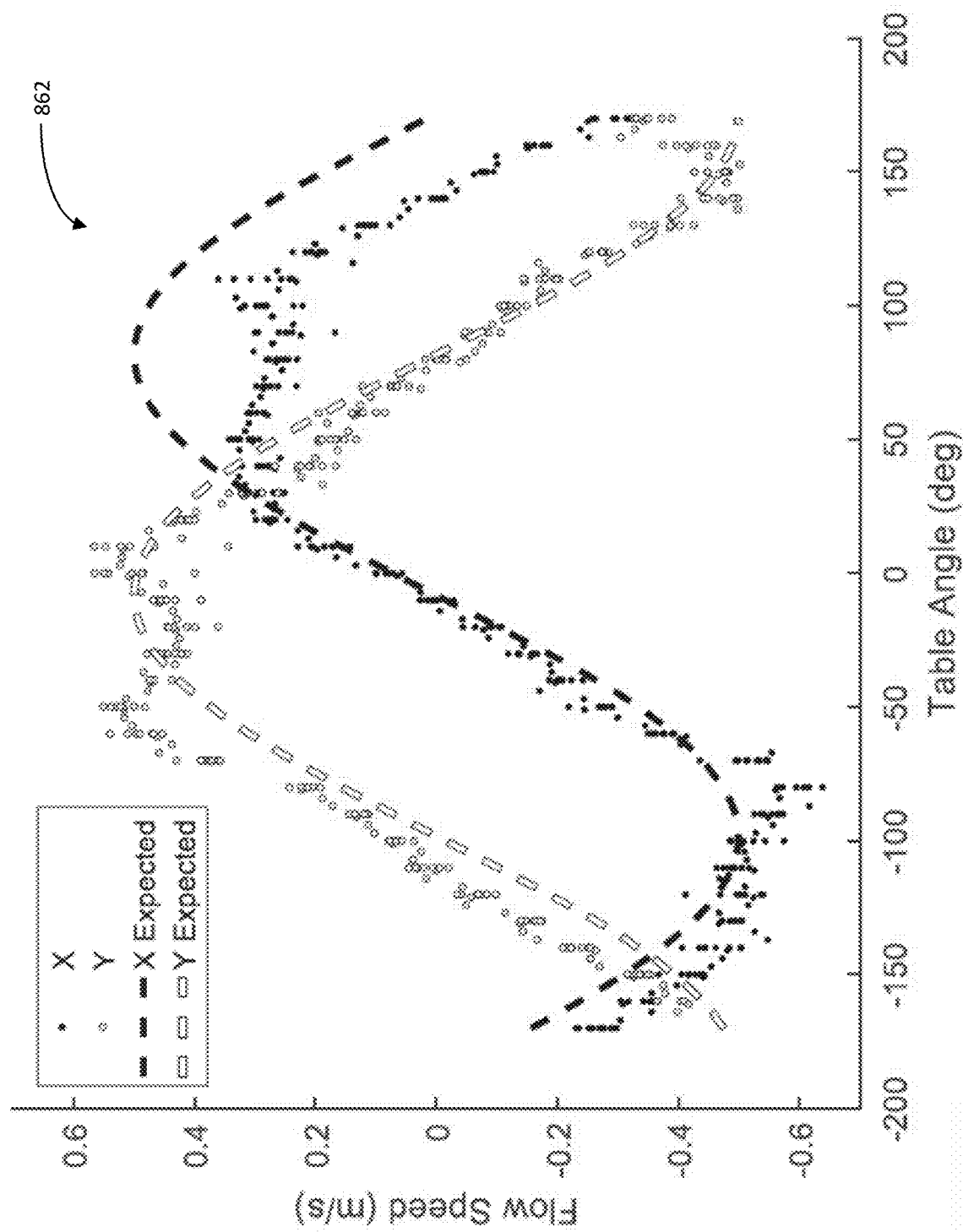
FIG. 14 is a graph of additional flow testing results as corrected for wake, in accordance with the present disclosure.

Referring now to FIGS. 13-14, results of flow testing in $CO_2$ at 6 mbar, 24° C. after applying the wake correction is shown via graphs 860 and 862. Rotating the anemometer through +/−170° rotation in steps of 10° at a flow speed of 4.0 m/s is shown via graph 860. Rotating the anemometer through +/−170° rotation in steps of 10° at a flow speed of 0.5 m/s is shown via graph 862. Referring to graphs 860 and 862, the points are sonic anemometer measurements, and the dashed lines are the expected flow velocities based on LDA velocity and angle.

After applying the wake correction, as shown in FIGS. 13-14, the measured results track expected flow velocities during rotation. The two data sets shown in FIGS. 13-14 are different runs than the data set used to measure the wake function in the first place. For graph 860, the RMS deviation from the expected curve is 25 cm/s in X, 23 cm/s in Y (for N=700 points). For graph 862, the RMS deviations from expected are 13 cm/s in X, 12 cm/s in Y (for N=350 points).

Figure 15:
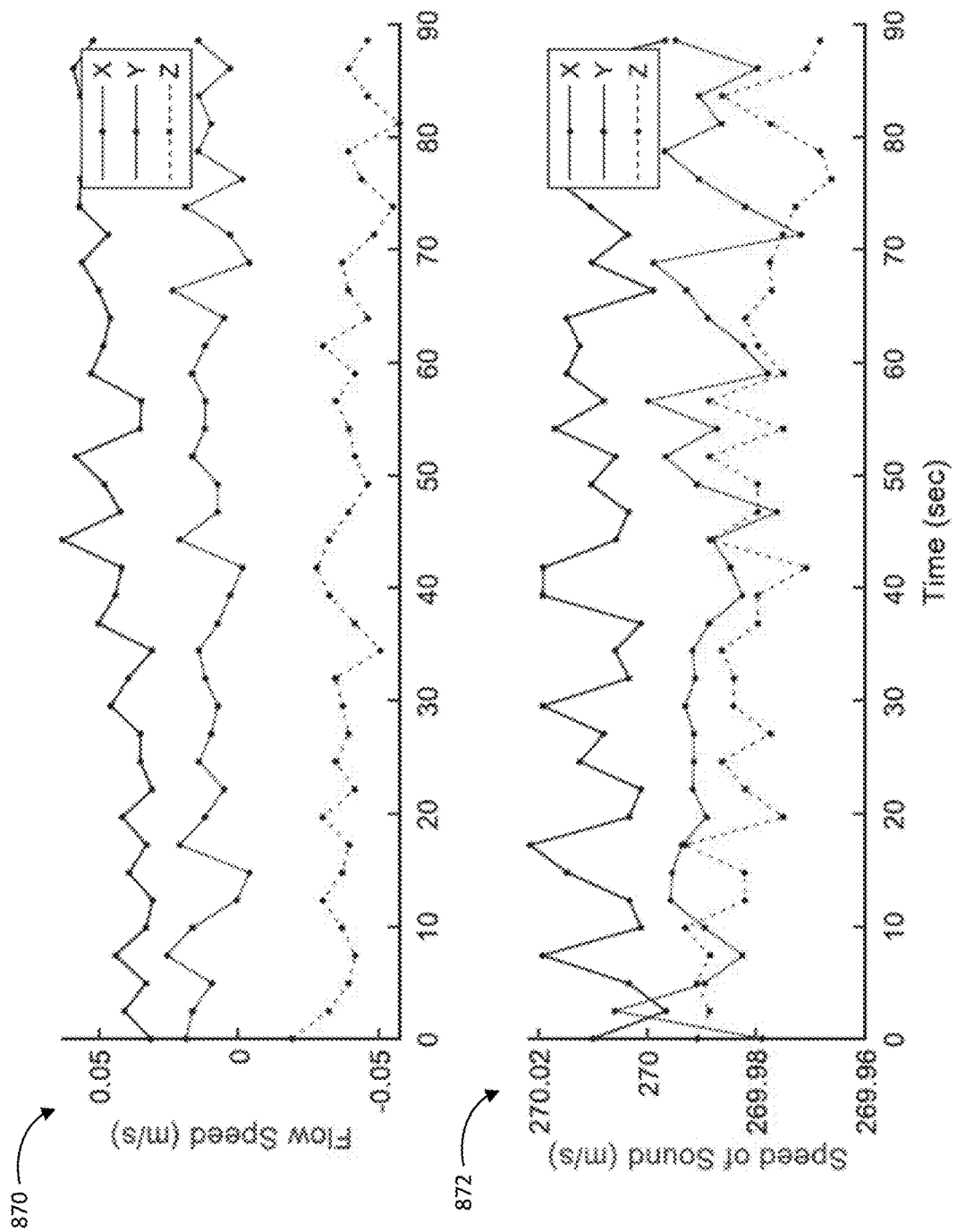
FIG. 15 is a graphical comparison of sonic anemometer flow speed and speed of sound measurements, in accordance with the present disclosure.

Two results for flow plotted against time (after applying wake corrections) at 6 mbar in $CO_2$ are shown in FIGS. 15 (plots 870, 872) and 16 (plots 880, 882, 884). The sampling rate is 0.4 S/sec for each channel. In the case of no flow (as shown by FIG. 15), the measured flow speeds exhibit zero offsets of less than 5 cm/s, and RMS variation about the mean of 0.7-0.9 cm/s. Speed of sound measurements conducted simultaneously give RMS variations of 0.7 cm/s for all three axes. This can be considered the ultimate resolution of the sonic anemometer system 800 under conditions of zero structural or flow-induced vibration and zero flow turbulence.

Figure 16:
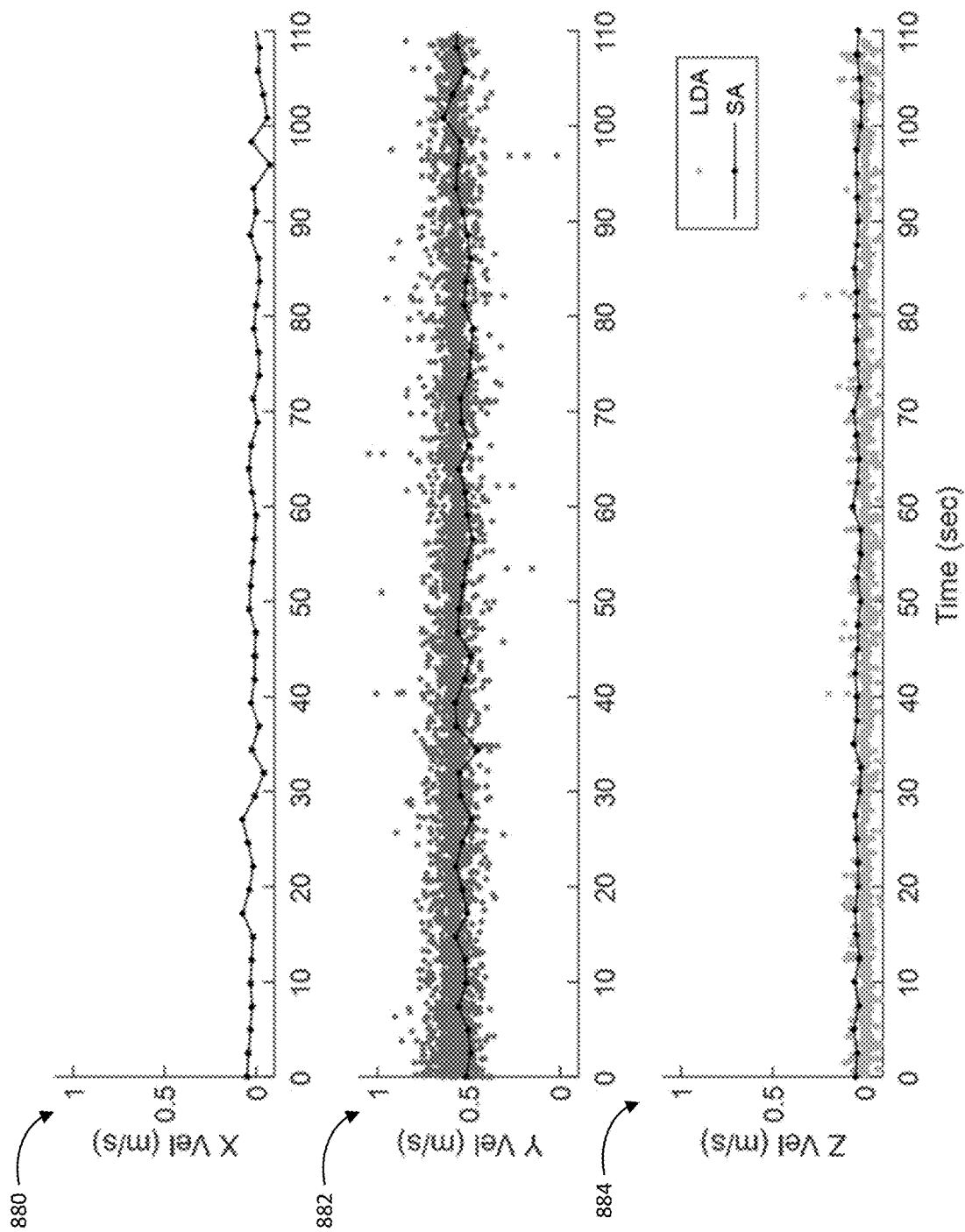
FIG. 16 is a graphical comparison of sonic anemometer and laser Doppler anemometer flow speeds, in accordance with the present disclosure.
Figure 17B:
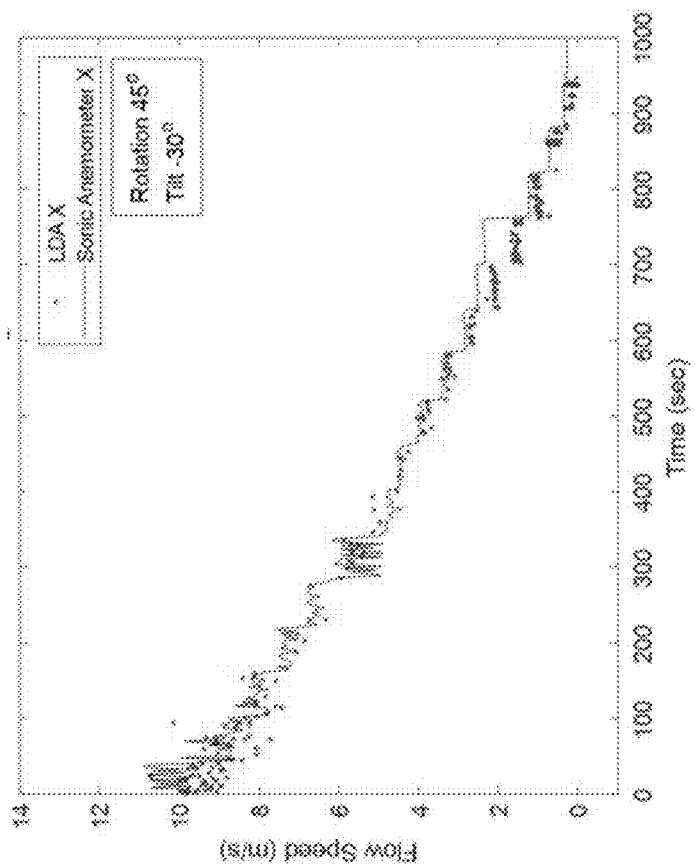
FIG. 17B is a graphical comparison of changing flow speeds as measured by the sonic anemometer and the laser Doppler anemometer, in accordance with the present disclosure.
Figure 17A:
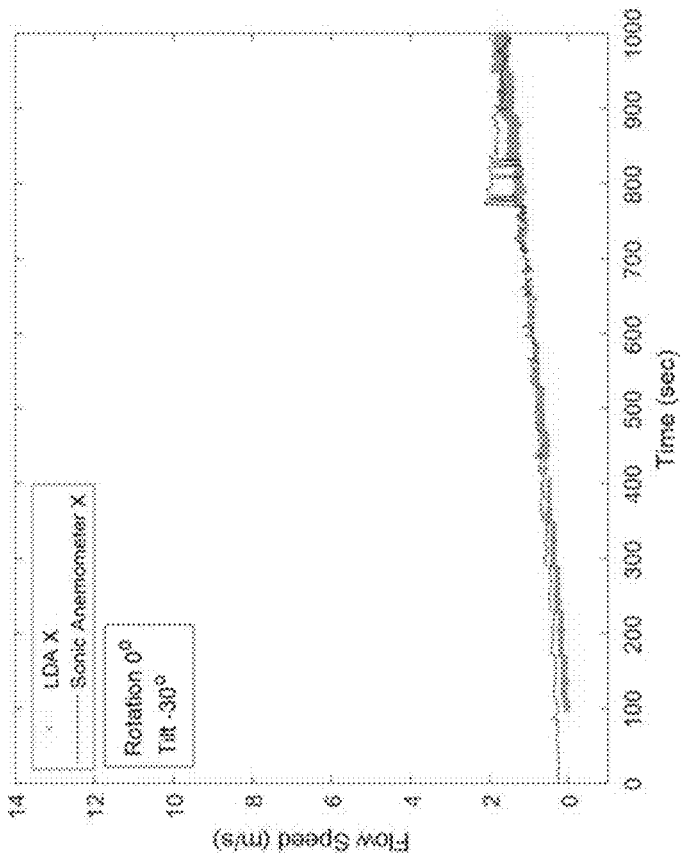
FIG. 17A is a graphical comparison of changing flow speeds as measured by the sonic anemometer and the laser Doppler anemometer, in accordance with the present disclosure.
Figure 17D:
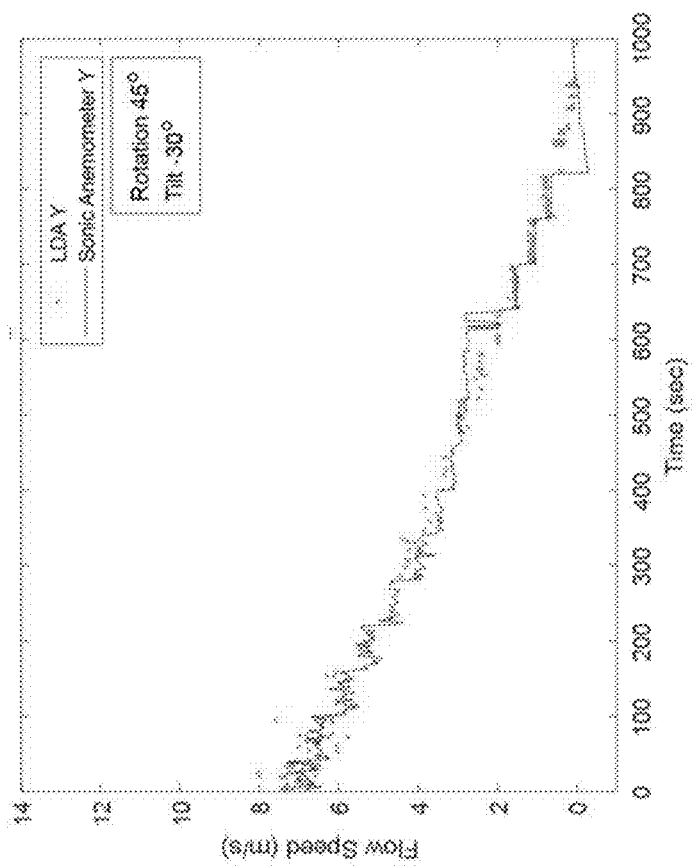
FIG. 17D is a graphical comparison of changing flow speeds as measured by the sonic anemometer and the laser Doppler anemometer, in accordance with the present disclosure.
Figure 17C:
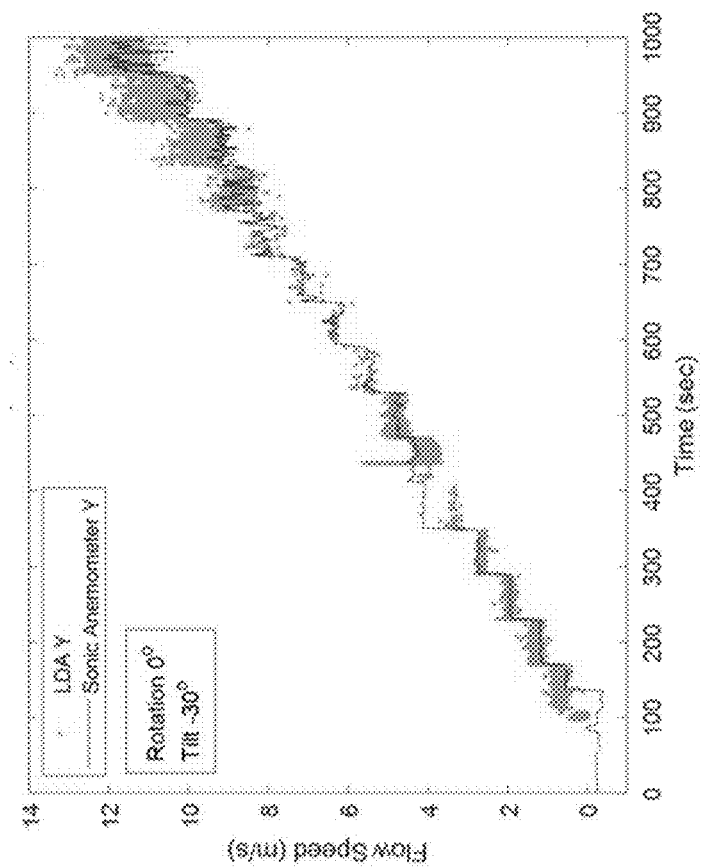
FIG. 17C is a graphical comparison of changing flow speeds as measured by the sonic anemometer and the laser Doppler anemometer, in accordance with the present disclosure.
Figure 17F:
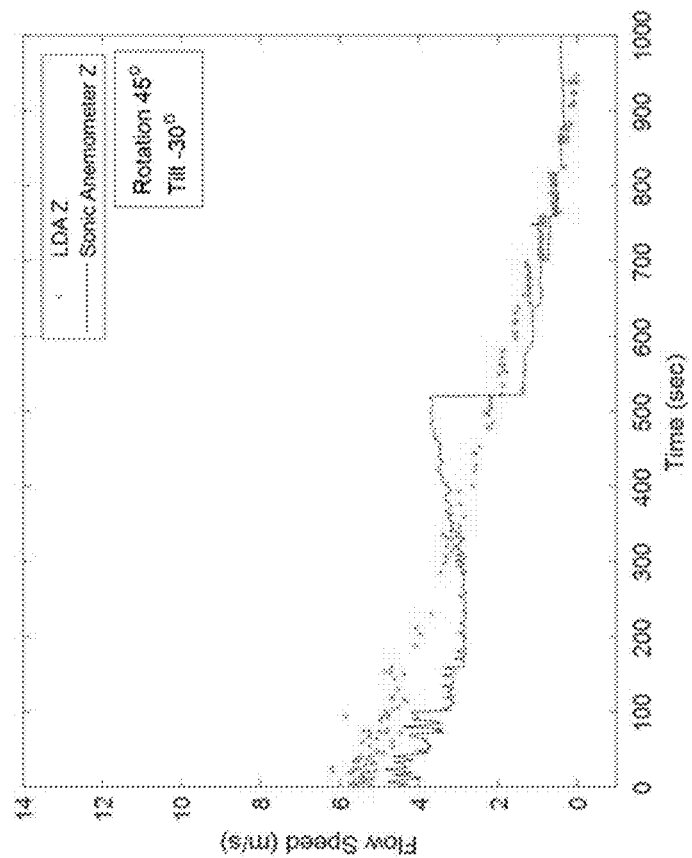
FIG. 17F is a graphical comparison of changing flow speeds as measured by the sonic anemometer and the laser Doppler anemometer, in accordance with the present disclosure.
Figure 17E:
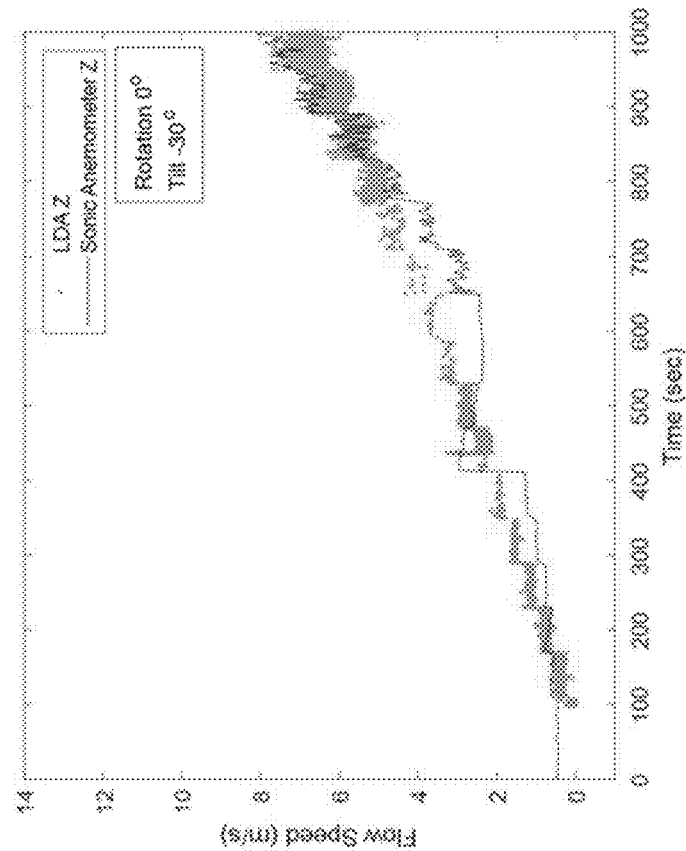
FIG. 17E is a graphical comparison of changing flow speeds as measured by the sonic anemometer and the laser Doppler anemometer, in accordance with the present disclosure.

For constant flow (as shown by FIG. 16), of approximately 60 cm/s at 6 mbar, with the spherical frame 802 in a 0° rotation, 0° tilt configuration (flow directed primarily along the Y axis), the sonic anemometer system 800 agrees with laser Doppler anemometry within 5 cm/s, with RMS variations about the mean of at most 4 cm/s. The LDA can measure only Y and Z direction velocity, but X (crossflow) velocity is expected to be small (<8 cm/s). The LDA had approximately N=6000 points across the 2 minute measurement. The sonic anemometer system 800 had N=45 points across the 2 minute measurement ($F_s$=0.4 S/s). All results are summarized in Table 1, shown below:

TABLE 1

| No flow and low speed constant flow results in 6 mbar $CO_2$, 21-23° C. Mean ± standard | | | |
|---|---|---|---|
| | X | Y | Z |
| No Flow, Sonic Anemometer | 4.4 ± 0.9 cm/s | 1.0 ± 0.7 cm/s | −3.9 ± 0.7 cm/s |

TABLE 1-continued

No flow and low speed constant flow
results in 6 mbar $CO_2$, 21-23° C. Mean ± standard

|  | X | Y | Z |
|---|---|---|---|
| Flow, Laser Doppler Anemometer |  | 57.6 ± 6.0 cm/s | −0.5 ± 3.4 cm/s |
| Flow, Sonic Anemometer | 1.0 ± 3.0 cm/s | 52.8 ± 3.5 cm/s | 3.8 ± 1.1 cm/s |

Referring now to FIGS. 17A-17F, comparisons of the sonic anemometer and laser Doppler anemometer measurements are shown. Specifically, the measurements were collected as flow speed was stepped up to a maximum of 12 m/s and then stepped back to 0. Each step was 1 minute in duration. During the ramp up, the anemometer was rotated at 0° and tilted at −30° with respect to the tunnel. During the ramp down, the anemometer was rotated at 45° and still tilted at −30°. These tilt angles point the open region of the anemometer into the flow. Tunnel conditions were 6±0.1 mbar $CO_2$, 24.5±2° C. over the course of two 15 minute runs. The sampling rate was 0.4 S/sec for each channel. RMS deviations between the LDA and sonic anemometer across both runs, as well as the wake parameter determined in each orientations, are given in Table 2 below. In all cases, a 20 second window centered on the flow step was excluded to remove points where the flow is dynamically changing. This results in N=277 points measured for each axis in each run.

TABLE 2

Results for stepping flow (see FIGS. 17A-17F)
in 6 mbar $CO_2$, 21-23° C.
N = 277 for each axis in each run.

|  | X | Y | Z |
|---|---|---|---|
| Stepping Up: 0° rotation, −30° tilt |  |  |  |
| Max Flow Speed | 1.6 m/s | 11.3 m/s | 6.5 m/s |
| Wake Parameter | 79% | 73% | 60% |
| Mean Offset | +15 cm/s | +9.8 cm/s | −13 cm/s |
| RMS Deviation | ±16.5 cm/s | ±40.9 cm/s | ±67.5 cm/s |
| Stepping Down: 45° rotation, −30° tilt |  |  |  |
| Max Flow Speed | 9.2 m/s | 6.9 m/s | 4.0 m/s |
| Wake Parameter | 89% | 85% | 50% |
| Mean Offset | +12 cm/s | −9.4 cm/s | +17 cm/s |
| RMS Deviation | ±38 cm/s | ±32 cm/s | ±60 cm/s |

Still referring to FIGS. 17A-17F, the X and Y-axes show similar results with wake parameters between 73-89% (the sonic anemometer system 800 measured slightly lower speeds than the free stream velocity due to self-shadowing). The wake effects were reduced (85-89%) during the second part of the run where the rotation is at 45°, which presents the maximally open aspect of the spherical frame 802 to the flow. The Z-axis had a higher wake effect at 50-60%. This is due to the large aspect of the system baseplate and mounting rods, which present more flow impedance in the Z-direction.

The X and Y-axes exhibit RMS deviations from the LDA results of between +16.5 cm/s and ±40.9 cm/s. This represents at most±3.6% of full scale (11.3 m/s). These deviations are driven by two factors: one is true flow velocity variation (turbulence), which is seen in the higher speed results of FIGS. 17A-17F in both the LDA and SA data. These fluctuations are a true feature of the flow and should be measured, although the spatial and temporal averaging for the two measurement techniques are different. The second driving factor for deviations are the discrete step errors seen at a few points through the run. These step errors appear to be due to nonlinearities near the ends of the phase measurement domain (near±90°). They are not wrapping errors. Avoiding measurement near±90° can address the step errors.

The Z-axis shows some nonlinearity with changing flow speed that is not present in the X and Y-axes, resulting in RMS deviations up to +67.5 cm/s. (+3.6% of full scale). It is postulated that the nonlinearities may be a result of the more substantial wake effects present in the Z-axis, again driven by the large flow occlusion from the baseplate and mounting structure. Reducing the size of the flow occlusion in Z can address this nonlinearity.

Figure 18:
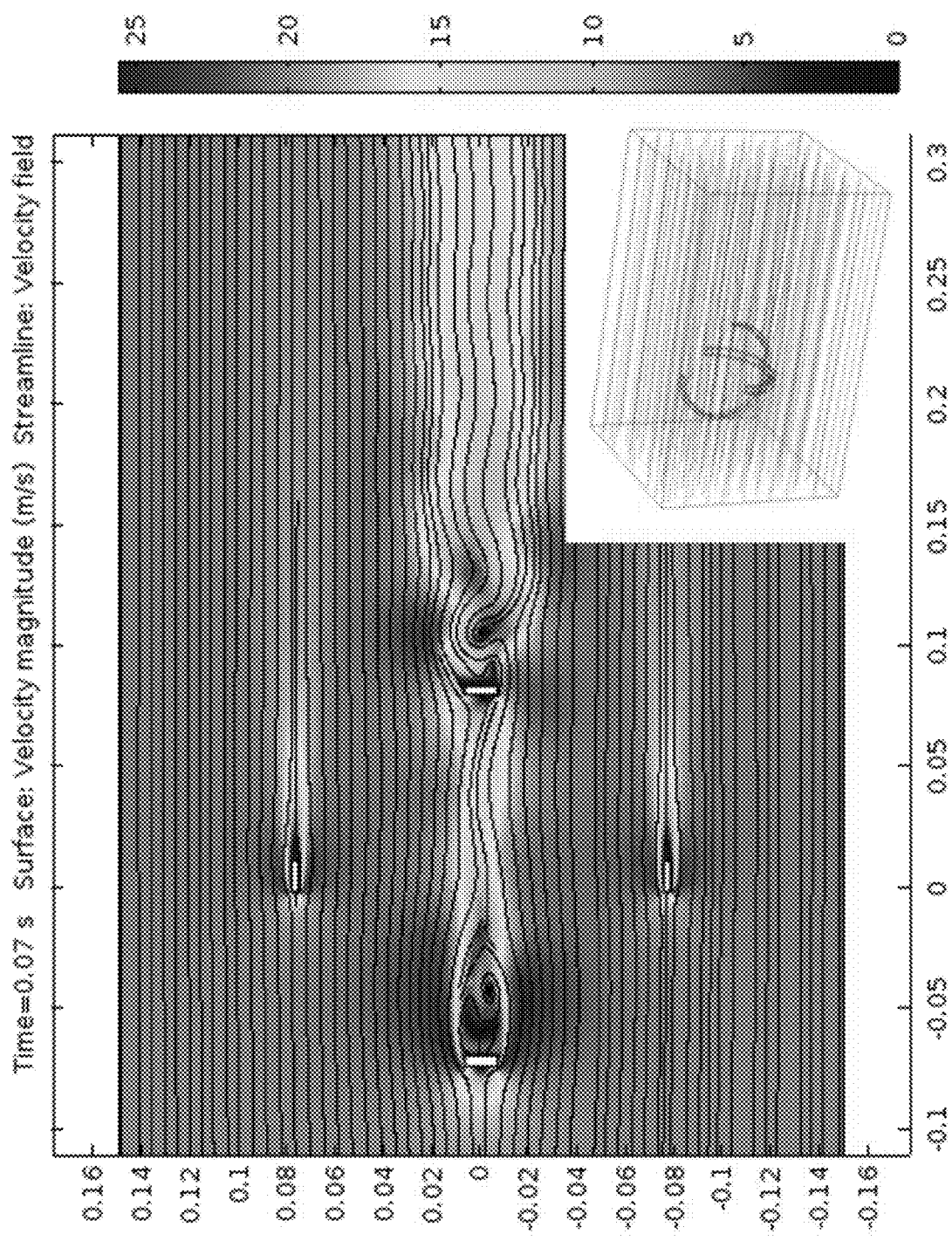
FIG. 18 is an example plot of wake effect, in accordance with the present disclosure.

Referring to FIG. 18, an example of wake effect is shown, according to aspects of the present disclosure. The time-resolved, three-dimensional flow simulation shows the wake effect of the geometry of the sonic anemometer system 800 for $CO_2$ at 6 mbar and −60° C. at 20 m/s (ReD≈260). The color bar is flow speed in m/s, and Cartesian dimensions are in meters.

The total mass of the mechanical frame, the 12 transducers, and all the internal cables was 299 g. The electronics in their PC board form, including enclosure and internal cables were 378 g. The total system, without the cables to connect between the electronics and the sensor head, was 677 g. Weight can be reduced by using a stiffer, less bulky frame, for example, built of a fiber composite.

The sonic anemometer system drew 51 mA from +15V, 36 mA from −15V, and approximately 40 mA from +5V for a low total power consumption of 1.6 W (notably, total power consumption may be reduced even further).

The present disclosure has described one or more preferred embodiments, and it should be appreciated that many equivalents, alternatives, variations, and modifications, aside from those expressly stated, are possible and within the scope of the invention.

We claim:

1. A sonic anemometer system for low pressure environments, the system comprising:
   a plurality of ultrasound transducer pairs, each ultrasound transducer pair comprising:
      a first ultrasound transducer configured to operate as at least one of a transmitter or a receiver of an acoustic signal; and
      a second ultrasound transducer configured to operate as at least another of the transmitter or the receiver of the acoustic signal;
   a controller in communication with the plurality of ultrasound transducer pairs, and configured to:
      obtain bi-directional acoustic data from the plurality of ultrasound transducer pairs as the acoustic signals interact with a fluid in between the plurality of ultrasound transducer pairs;
      measure at least one of flight times or phase lags corresponding to the bi-directional acoustic data;
      calculate at least one of a sound speed in or a flow speed of the fluid corresponding to each ultrasound transducer pair from at least one of the bi-directional flight times or phase lags;
      access a system model that relates wake effects to a transfer function corresponding to the plurality of ultrasound transducer pairs;

correct for wake effects, using the system model by:
  i.) measuring a wake parameter associated with the sonic anemometer system at a plurality of flow directions and a plurality of Reynold's numbers;
  ii.) estimating a current incoming flow direction using current and previous flow measurements;
  iii.) determining a current temperature and pressure;
  iv.) determining the Reynold's number using the incoming flow direction, flow speed, and the current temperature and pressure;
  v.) calculating a corrected flow speed and direction by applying the wake parameter corresponding to the Reynold's number;
  vi.) repeating step iv.) using the corrected flow speed and direction; and
  vii.) repeating steps iv.)-vi.) until a converged flow speed and direction are obtained; and
generate a report including at least one of a sound speed in or the flow speed of the fluid.

2. The system of claim 1, wherein the system model further relates at least one of temperature effects or pressure effects to the transfer function, and wherein the controller is further configured to correct for at least one of temperature or pressure effects by:
  measuring parameters of the transfer function as a function of temperature or pressure;
  determining a current temperature or pressure corresponding to the plurality of ultrasound transducer pairs;
  determining, using the current temperature or pressure, a phase contribution of the plurality of ultrasound transducer pairs to the measured parameters of the transfer function; and
  subtracting the phase contribution from at least one of the measured phase lags or flight times.

3. The system of claim 2, wherein determining the current temperature or pressure comprises:
  receiving a temperature measurement from a temperature sensor proximate to the sonic anemometer system; or
  receiving a pressure measurement from a pressure sensor; and
  deriving magnitude and frequency data from the bi-directional acoustic data.

4. The system of claim 1, wherein the system model further relates at least one of temperature effects or pressure effects to the transfer function, and wherein the controller is further configured to correct for temperature and pressure effects by:
  determining a mathematical model relating a frequency response of the plurality of ultrasound transducer pairs to an electrical input impedance of the ultrasound transducer pairs;
  measuring the electrical input impedance of the ultrasound transducer pairs during operation;
  determining a phase correction corresponding to the measured electrical input impedance; and
  subtracting the phase correction from at least one of the measured phase lags or flight times.

5. The system of claim 1, wherein measuring the wake parameter comprises at least one of measuring a wake in a wind tunnel and modeling the wake via a computational fluid dynamic model.

6. The system of claim 1, wherein the plurality of ultrasound transducer pairs comprises three ultrasound transducer pairs defining three mutually orthogonal axes, and the controller is configured to calculate at least one of a three-dimensional flow velocity or sound speed.

7. The system of claim 6, wherein the controller is configured to selectively and independently operate each one of the three ultrasound transducer pairs.

8. The system of claim 1, wherein the ultrasound transducer pairs comprise narrow band piezoelectric transducers configured to operate at less than 15 volts peak-to-peak at center frequencies within a range of 30 to 100 kilohertz.

9. The system of claim 8, wherein the narrow band piezoelectric transducers have a −3 decibel full width fractional bandwidth between 1% and 10%.

10. The system of claim 1, wherein the controller is configured to obtain the bi-directional acoustic data in an atmospheric environment having a pressure of 100 mbar or less.

11. The system of claim 1, wherein the controller is further configured to measure absorption spectra and calculate at least one of the sound speed or flow speed from the absorption spectra.

12. A method of determining at least one of sound speed or flow speed in a low pressure environment, the method comprising:
  obtaining bi-directional acoustic data from a plurality of ultrasound transducer pairs as acoustic signals interact with a fluid in between the plurality of ultrasound transducer pairs;
  measuring at least one of flight times or phase lags corresponding to the bi-directional acoustic data;
  calculating at least one of a sound speed in or a flow speed of the fluid corresponding to each ultrasound transducer pair from at least one of the bi-directional flight times or phase lags;
  accessing a system model that relates wake effects to a transfer function corresponding to the plurality of ultrasound transducer pairs;
  correcting for wake effects, using the system model by:
    i.) measuring a wake parameter associated at a plurality of flow directions and a plurality of Reynold's numbers,
    ii.) estimating a current incoming flow direction using current and previous flow measurements;
    iii.) determining a current temperature and pressure;
    iv.) determining the Reynold's number using the incoming flow direction, flow speed, and the current temperature and pressure;
    v.) calculating a corrected flow speed and direction by applying the wake parameter corresponding to the Reynold's number;
    vi.) repeating step iv.) using the corrected flow speed and direction; and
    vii.) repeating steps iv.)-vi.) until a converged flow speed and direction are obtained; and
  generating a report including at least one of a sound speed in or the flow speed of the fluid.

13. The method of claim 12, wherein the system model further relates at least one of temperature effects or pressure effects to the transfer function, and wherein the method further comprises correcting for at least one of temperature or pressure effects by:
  measuring parameters of the transfer function as a function of temperature or pressure;
  determining a current temperature or pressure corresponding to the plurality of ultrasound transducer pairs;
  determining, using the current temperature or pressure, a phase contribution of the plurality of ultrasound transducer pairs to the measured parameters of the transfer function; and subtracting the phase contribution from at least one of the measured phase lags or flight times.

14. The method of claim 13, wherein determining the current temperature or pressure comprises:
receiving a temperature measurement from a temperature sensor; or
receiving a pressure measurement from a pressure sensor; and
deriving magnitude and frequency data from the bi-directional acoustic data.

15. The method of claim 12, wherein the system model further relates at least one of temperature effects or pressure effects to the transfer function, and wherein the method further comprises correcting for temperature and pressure effects by:
determining a mathematical model relating a frequency response of the plurality of ultrasound transducer pairs to an electrical input impedance of the ultrasound transducer pairs;
measuring the electrical input impedance of the ultrasound transducer pairs during operation;
determining a phase correction corresponding to the measured electrical input impedance; and
subtracting the phase correction from at least one of the measured phase lags or flight times.

16. The method of claim 12, wherein measuring the wake parameter comprises at least one of measuring a wake in a wind tunnel and modeling the wake via a computational fluid dynamic model.

17. The method of claim 12, wherein determining a current temperature and pressure comprises:
receiving a temperature measurement from a temperature sensor; and
receiving a pressure measurement from a pressure sensor.

18. The method of claim 12, further comprising:
defining three mutually orthogonal axes from the respective position of each of the plurality of ultrasound transducer pairs; and
calculating at least one of a multi-dimensional flow velocity or sound speed.

19. The method of claim 12, further comprising selectively and independently operating each one of the plurality of ultrasound transducer pairs.

20. The method of claim 12, further comprising measuring an absorption spectra and calculating at least one of the sound speed or flow speed from the absorption spectra.

21. A sonic anemometer system for low pressure environments, the system comprising:
a plurality of ultrasound transducer pairs, each ultrasound transducer pair comprising:
a first ultrasound transducer configured to operate as at least one of a transmitter or a receiver of an acoustic signal; and
a second ultrasound transducer configured to operate as at least another of the transmitter or the receiver of the acoustic signal;
a controller in communication with the plurality of ultrasound transducer pairs, and configured to:
obtain bi-directional acoustic data from the plurality of ultrasound transducer pairs as the acoustic signals interact with a fluid in between the plurality of ultrasound transducer pairs;
measure at least one of flight times or phase lags corresponding to the bi-directional acoustic data;
calculate at least one of a sound speed in or a flow speed of the fluid corresponding to each ultrasound transducer pair from at least one of the bi-directional flight times or phase lags;
access a system model that relates at least one of temperature effects or pressure effects to a transfer function corresponding to the plurality of ultrasound transducer pairs;
correct for at least one of temperature or pressure effects by:
measuring parameters of the transfer function as a function of temperature or pressure;
determining a current temperature or pressure corresponding to the plurality of ultrasound transducer pairs;
determining, using the current temperature or pressure, a phase contribution of the plurality of ultrasound transducer pairs to the measured parameters of the transfer function; and
subtracting the phase contribution from at least one of the measured phase lags or flight times; and
generate a report including at least one of a sound speed in or the flow speed of the fluid.

* * * * *